US012739540B2

(12) United States Patent
Al Sayeed

(10) Patent No.: US 12,739,540 B2
(45) Date of Patent: Sep. 15, 2026

(54) SINGLE SPAN CALIBRATION IN A MULTI-SPAN OPTICAL LINE SYSTEM

(71) Applicant: Ciena Corporation, Hanover, MD (US)

(72) Inventor: Choudhury A. Al Sayeed, Stittsville (CA)

(73) Assignee: Ciena Corporation, Hanover, MD (US)

( * ) Notice: Subject to any disclaimer, the term of this patent is extended or adjusted under 35 U.S.C. 154(b) by 946 days.

(21) Appl. No.: 18/080,494

(22) Filed: Dec. 13, 2022

(65) Prior Publication Data

US 2023/0116474 A1 Apr. 13, 2023

Related U.S. Application Data

(63) Continuation-in-part of application No. 17/173,844, filed on Feb. 11, 2021, now Pat. No. 11,658,452.

(51) Int. Cl.
*H01S 3/00* (2006.01)
*H04J 14/02* (2006.01)
*H04Q 11/00* (2006.01)

(52) U.S. Cl.
CPC .... *H04Q 11/0067* (2013.01); *H04J 14/02216* (2023.08); *H04Q 2011/0081* (2013.01); *H04Q 2011/0083* (2013.01)

(58) Field of Classification Search
CPC ....... H04Q 11/0067; H04Q 2011/0081; H04Q 2011/0083; H04J 14/02216
See application file for complete search history.

(56) References Cited

U.S. PATENT DOCUMENTS 5,892,615 A 4/1999 Grubb et al.
5,905,745 A 5/1999 Grubb et al.
6,115,403 A 9/2000 Brenner et al.
6,275,632 B1 8/2001 Waarts et al.
6,404,948 B2 6/2002 Alexander et al.
6,407,863 B1 6/2002 Archambault et al.
6,459,516 B1 10/2002 Mizrahi et al.
6,614,959 B1 9/2003 Mizrahi et al.
6,795,607 B1 9/2004 Archambault et al.
(Continued)

FOREIGN PATENT DOCUMENTS

CA 2 189 568 C 10/2002
CA 3 089 139 A1 11/2019
(Continued)

*Primary Examiner* — Mark Hellner
(74) *Attorney, Agent, or Firm* — Baratta Law PLLC; Lawrence A. Baratta, Jr.

(57) ABSTRACT

Systems and methods include, responsive for a requirement to calibrate a single span in a multi-span optical line system where the single span includes a from-end node and a to-end node, determining no other upstream node in the multi-span optical multiplex section is currently calibrating or faulted; responsive to no other upstream node currently calibrating or faulted, calibrating the from-end node with a new target launch power into a fiber associated with the single span; and calibrating the to-end node keeping target launch power into a fiber associated with an immediate downstream span from the single span uninterrupted from a previous calibration. The to-end node and the from-end node are each (1) an intermediate line amplifier or (2) a terminal node and an intermediate line amplifier, in the multi-span optical line system.

18 Claims, 12 Drawing Sheets

(56) References Cited

U.S. PATENT DOCUMENTS

| | | | |
|---|---|---|---|
| 7,231,107 B1 | 6/2007 | Zhong et al. | |
| 7,254,327 B1 | 8/2007 | Zhong et al. | |
| 7,693,357 B2 | 4/2010 | Marrakchi El Fellah et al. | |
| 7,809,272 B2 | 10/2010 | Zhong et al. | |
| 7,962,049 B2 | 6/2011 | Mateosky et al. | |
| 8,364,036 B2 | 1/2013 | Boertjes et al. | |
| 8,457,497 B2 | 6/2013 | Zhong et al. | |
| 8,467,688 B2 | 6/2013 | Archambault et al. | |
| 8,509,621 B2 | 8/2013 | Boertjes et al. | |
| 8,625,994 B2 | 1/2014 | Archambault et al. | |
| 8,774,632 B2 | 7/2014 | Archambault | |
| 8,817,245 B2 | 8/2014 | Archambault et al. | |
| 9,060,215 B2 | 6/2015 | Miedema | |
| 9,140,624 B2 | 9/2015 | Bao et al. | |
| 9,419,708 B2 | 8/2016 | Rad et al. | |
| 9,680,569 B2 | 6/2017 | Archambault et al. | |
| 9,793,986 B2 | 10/2017 | Archambault et al. | |
| 9,806,803 B2 | 10/2017 | Bownass et al. | |
| 9,882,634 B1 | 1/2018 | Al Sayeed et al. | |
| 9,973,295 B2 | 5/2018 | Al Sayeed et al. | |
| 10,063,313 B1 | 8/2018 | Al Sayeed et al. | |
| 10,237,011 B2 | 3/2019 | Al Sayeed et al. | |
| 10,237,633 B2 | 3/2019 | Chedore et al. | |
| 10,250,326 B2 | 4/2019 | Bao et al. | |
| 10,263,386 B1 | 4/2019 | Sridhar et al. | |
| 10,277,311 B2 | 4/2019 | Archambault et al. | |
| 10,277,352 B2 | 4/2019 | Chedore et al. | |
| 10,374,704 B2 | 8/2019 | Archambault et al. | |
| 10,439,709 B1 | 10/2019 | Al Sayeed | |
| 10,454,609 B2 | 10/2019 | Chedore et al. | |
| 10,536,235 B2 | 1/2020 | Al Sayeed et al. | |
| 10,541,748 B1 | 1/2020 | Chedore | |
| 10,547,404 B1 * | 1/2020 | Al Sayeed | H04B 10/27 |
| 10,630,417 B1 | 4/2020 | Chedore et al. | |
| 10,680,737 B1 | 6/2020 | Al Sayeed et al. | |
| 10,680,739 B2 | 6/2020 | Swinkels et al. | |
| 10,735,837 B1 | 8/2020 | Al Sayeed et al. | |
| 10,746,602 B2 | 8/2020 | Pei et al. | |
| 2007/0086332 A1 * | 4/2007 | Way | H04J 14/0283<br>370/223 |
| 2009/0154941 A1 | 6/2009 | Mateosky et al. | |
| 2014/0055777 A1 | 2/2014 | Archambault et al. | |
| 2014/0348501 A1 | 11/2014 | Bao et al. | |
| 2019/0097719 A1 | 3/2019 | Chedore et al. | |
| 2019/0101447 A1 | 4/2019 | Pei et al. | |
| 2019/0238251 A1 | 8/2019 | Chedore et al. | |
| 2020/0007262 A1 | 1/2020 | Chedore et al. | |
| 2020/0228197 A1 | 7/2020 | Bhatnagar et al. | |
| 2020/0374001 A1 | 11/2020 | Chedore et al. | |

FOREIGN PATENT DOCUMENTS

| | | | |
|---|---|---|---|
| CN | 100401688 C * | 7/2008 | H04B 10/03 |
| EP | 1 284 528 A2 | 2/2003 | |
| EP | 2 564 532 B1 | 10/2017 | |
| WO | 9419713 A1 | 9/1994 | |

* cited by examiner

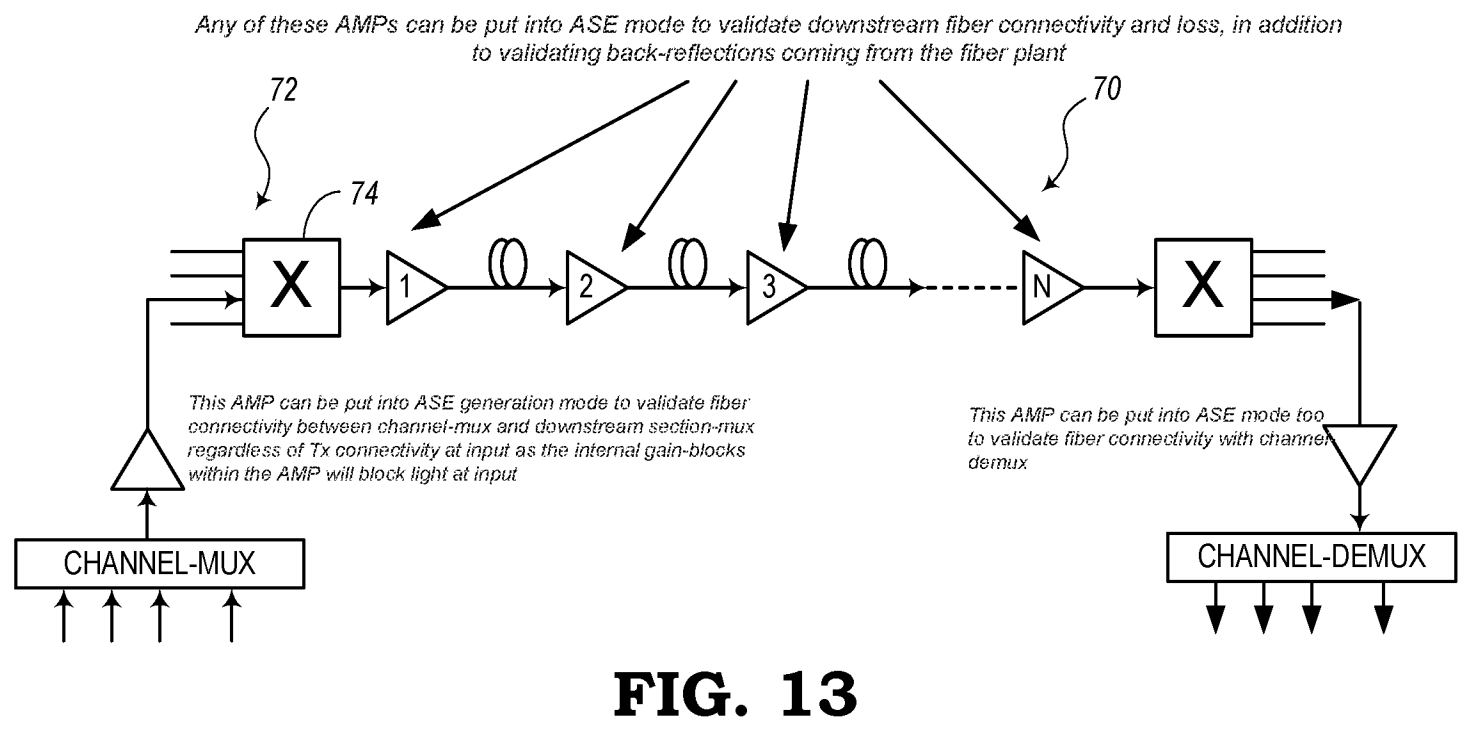

Any of these AMPs can be put into ASE mode to validate downstream fiber connectivity and loss, in addition to validating back-reflections coming from the fiber plant

70

72

74

X

1

2

3

N

X

This AMP can be put into ASE generation mode to validate fiber connectivity between channel-mux and downstream section-mux regardless of Tx connectivity at input as the internal gain-blocks within the AMP will block light at input This AMP can be put into ASE mode too to validate fiber connectivity with channel demux

CHANNEL-MUX

CHANNEL-DEMUX

FIG. 13

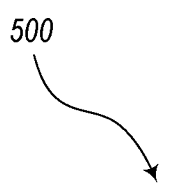
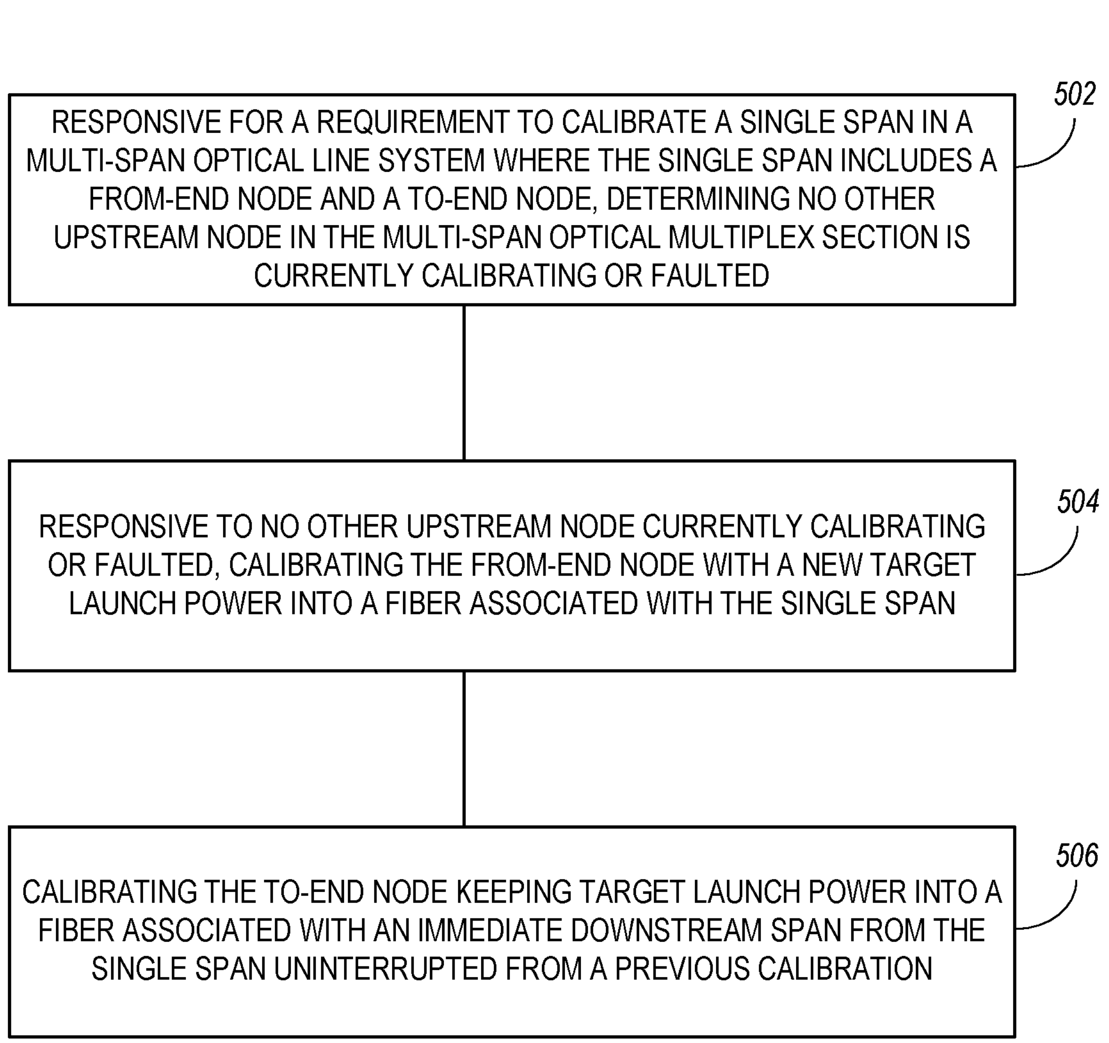
FIG. 17

SINGLE SPAN CALIBRATION IN A MULTI-SPAN OPTICAL LINE SYSTEM

CROSS-REFERENCE

The present disclosure is a continuation-in-part of U.S. patent application Ser. No. 17/173,844, filed Feb. 11, 2021, and entitled "Powering up an optical amplifier in an optical line system," the contents of which are incorporated by reference in their entirety.

TECHNICAL FIELD

The present disclosure generally relates to optical networks. More particularly, the present disclosure relates to single span calibration in a multi-span optical line system.

BACKGROUND

Optical communication networks are configured to propagate data between pairs of network devices (e.g., client devices, servers, etc.) over multiple optical communication links throughout the network. Since there is an ever-growing need for more and more communication services, optical communication networks continue to grow while new optical communication networks continue to be added. With expanding communication system infrastructures, there is often a need to add optical amplifiers to enable data propagation over a span of optical fibers.

When trucks are rolled out in the field to install line amplifiers (e.g., Intermediate Line Amplifiers or ILAs) at certain installation sites, the installers typically need to make sure the optical fibers and patch panels are properly connected to a newly installed amplifier module at the sites. When long optical links are built between two nodes in the optical communication network, truck-rolls may be deployed asynchronously. In other words, when a line amplifier (e.g., ILA) is being installed at one site, there is no guarantee that line amplifiers have already been installed at upstream or downstream sites. Therefore, installers may not be able to determine if a line amplifier is properly connected to the optic fibers at the installation site, but instead may only rely on local visibility regarding fiber connectivity.

In conventional installation processes, fibers may be tested using Optical Time-Domain Reflectometry (OTDR) traces. Once upstream nodes from a section head are connected with each other, light is able to flow through from section head (or from some other upstream source) to complete a local ILA node calibration for a given direction. Then, the fibers may be cleaned before being connected to the line amplifiers. However, since end-to-end light connectivity may or may not be present at this point, the installers may not be able to test the connectivity and would thus leave the site.

In addition to connectivity issues, other issues may arise at an installation site that may be not detected using conventional processes. For example, if connectors along the patch panels are dirty or loose, the line amplifier may experience high back-reflection, which may lead to non-linear multi-path interference issues. In response, the amplifier may typically reduce the total output power automatically (e.g., to less than about 10 dBm). However, at this level, it would not be possible to calibrate the amplifier and the amplifier would be unable to carry traffic beyond a certain limit.

Therefore, in such case when issues are later detected in a newly installed line amplifier, the installers would be required to return to the field to fix potential fiber issues at the site. Of course, deploying installers multiple times to install a line amplifier would be very costly to vendors. Not only would operational expenditures increase with multiple deployments, but also there would be a delay in powering up and utilizing the amplifier (e.g., turn-up). Therefore, there is a need in the field of line amplifier installation to provide systems and methods for overcoming the deficiencies currently experienced in the field today.

Also, with the introduction of Dynamic Gain Flattening Filter (DGFF) modules in optical amplifiers, optical line systems can be deployed with very long chain of Inline Amplifiers (ILAs) or span-counts for a given Optical Multiplex Section (OMS). Typical deployments can include 16-20× spans (~1600 km) in a long-haul network, and in some cases, that extends to 30× spans (~2400 km) or even up to 50× spans (~4000 km). After initial deployment of an optical line system, there are use cases in the field that requires calibration or recalibration of a single span or plurality of discrete spans within the OMS.

Current approaches for calibration or recalibration only allow calibrating the complete OMS and does not support single span calibration, i.e., a single span within the OMS. This is primarily because, changing calibrated setpoints for a given node (such as launch powers to fiber span) affect all downstream spans, in the OMS. Hence, existing calibration or recalibration approaches always sequence actions from one node to next (in the direction of light) until the tail of an OMS. However, calibration or recalibration of optical line system is time-expensive and affects the recovery time in a Maintenance Window (MW). For example, a 50× spans OMS calibration can take around 2 hours to complete. When only one or a few spans require changes in a MW, it becomes costly to run the full OMS calibration/re-calibration actions.

There is a need for an approach that will allows a single spam calibration action without disrupting calibrated setpoints to any downstream spans and avoids the need for full OMS calibration.

BRIEF SUMMARY

The present disclosure is directed to systems, methods, and non-transitory computer-readable media associated with single span calibration in a multi-span optical line system. The present disclosure includes automatically detecting the need for single-span recalibration, such as following OLF recovery and comparing fiber-span characteristics with previous settings before the OLF. Such fiber characteristics include fiber-type, fiber-loss, target launch power profile etc. The present disclosure also ensures the single span calibration does not perturb launch spectrum to downstream spans, to avoid full OMS recalibration. By considering the previously saved snapshot from a last calibration as a target for downstream node to avoid spectrum disruption any further down, and by ensuring the calibration sequencing remains limited to the two ends of the given fiber span only by blocking propagation further downstream.

In an embodiment, a method includes steps of, responsive for a requirement to calibrate a single span in a multi-span optical line system where the single span includes a from-end node and a to-end node, determining no other upstream node in the multi-span optical multiplex section is currently calibrating or faulted; responsive to no other upstream node currently calibrating or faulted, calibrating the from-end node with a new target launch power into a fiber associated with the single span; and calibrating the to-end node keeping target launch power into a fiber associated with an immediate downstream span from the single span uninterrupted from a previous calibration.

The to-end node and the from-end node are each one of (1) an intermediate line amplifier and (2) a terminal node and an intermediate line amplifier, in the multi-span optical line system. The calibrating the from-end node can include setting the new target launch power based on provisioned or discovered characteristics of the single span. The characteristics can include any of fiber type, span loss, inclusion or exclusion of Raman amplification, and span length. The keeping target launch power into a fiber associated with an immediate downstream span can include using a baseline power profile taken on the line-out port from a previous calibration. The calibrating the to-end node can include setting all actuators at the to-end node to the baseline line-out power profile, such that the calibration of the single span does not disrupt any downstream spans.

The calibrating the from-end node and the calibrating the to-end node can include performing Raman gain calibration if present. The calibrating the from-end node and the calibrating the to-end node can include setting target gain and gain tilt for any Erbium Doped Fiber Amplifiers (EDFAs), running gain-calibration and setting target-gain for Raman amplifiers if present, and setting loss for Variable Optical Attenuators (VOAs). The calibrating the from-end node and the calibrating the to-end node can include setting Dynamic Gain Flattening Filter (DGFF) attenuation based on cumulative gain-ripples coming from upstream spans. The requirement to calibrate the single span can include a plurality of discrete or continuous spans in the multi-span optical multiplex section, and wherein the steps include sequencing a calibration of the plurality of discrete or continuous spans in the multi-span optical multiplex section. The requirement can be one of a user-initiated calibration, subsequent to an Optical Line Fail (OLF) recovery, a change in fiber type or fiber characteristics, a change in span loss, and a change in Raman amplification.

Also, the present disclosure is directed to systems, methods, and non-transitory computer-readable media associated with line amplifiers and external control devices for executing bootstrap and/or power-up procedures when a line amplifier or optical amplifier card is first installed along an optical link joining two adjacent nodes in a communications network. According to one implementation, an optical amplifier includes one or more gain units each configured to amplify an optical signal; a processing device; and a memory device configured to store a bootstrap program having instructions that, when executed, enable the processing device to block an input to the one or more gain units, and cause the optical amplifier to operate in an Amplified Spontaneous Emission (ASE) mode. The instructions can further enable the processing device to, in response to a detection of a valid power level, switch the optical amplifier from the ASE mode to a regular operating mode, and unblock the input to the one or more gain units to allow operation of the optical amplifier in the regular operating mode. Detection of the valid power level can include one or more of determining that an input optical power is above a shutoff threshold, and confirming connectivity with an upstream Optical Supervisory Channel (OSC) device. Detection of the valid power level can further include determining that a back-reflection detected at an output of the optical amplifier is below a predetermined threshold.

The instructions can further enable the processing device to automatically power up the optical amplifier to operate in the ASE mode in absence of any instructions from higher layer controller or processing device. The processing device can be configured to automatically power up the optical amplifier to operate in ASE mode independent of any upstream or downstream connectivity and fault conditions. The optical amplifier can be one of an intermediate line amplifier newly installed in the optical line system intermediately between two adjacent nodes and connected to a channel multiplexer or demultiplexer. The optical amplifier can further include a light blocking device connected to the input to the one or more gain units, wherein blocking the input to the one or more gain units includes controlling the light blocking device to shut off optical power to the one or more gain units. The one or more gain units can include one or more controllable gain units, and wherein blocking the input to the one or more gain units includes shutting off the one or more controllable gain units. The one or more gain units can further include one or more ASE-generating units configured to enable the optical amplifier to operate in the ASE mode. Operating in the ASE mode can include providing a power level below a fiber damage threshold level and above a level configured to enable detection of back-reflection at an output of the optical amplifier.

In other embodiments, a method includes steps and a mon-transitory computer-readable medium configured to store computer logic includes instructions that, when executed, cause one or more processing devices to perform the steps. The steps include, responsive to executing a bootstrap program for an optical amplifier having one or more gain units each configured to amplify an optical signal, causing a block of an input to the one or more gain units; and causing the optical amplifier to operate in an Amplified Spontaneous Emission (ASE) mode. The steps can further include, in response to a detection of a valid power level, switching the optical amplifier from the ASE mode to a regular operating mode; and causing an unblock of the input to the one or more gain units to allow operation of the optical amplifier in the regular operating mode. The executing can include automatically powering up the optical amplifier to operate in the ASE mode in absence of any instructions from higher layer controller or processing device. The causing the block can include controlling a light blocking device to shut off optical power to the one or more gain units. The causing the block can include shutting off one or more controllable gain units.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 13 is a diagram illustrating a portion of an optical communication network including amplifiers on the local add/drop, according to various embodiments.

FIG. 17 is a flowchart of a process 500 for single span calibration.

DETAILED DESCRIPTION

The present disclosure is directed to systems, methods, and non-transitory computer-readable media associated with single span calibration in a multi-span optical line system. Also, the present disclosure relates to optical communication networks and systems and methods for controlling a bootstrapping or turn-up process when a line amplifier is newly installed along an optical communication link between two adjacent nodes in the optical communication network. With the control features described with respect to the various embodiments of the present disclosure, it is possible to automatically power-up and test a newly-installed amplifier module to ensure that the amplifier module is properly installed. The control aspects described here allow the amplifier module to be installed essentially as a plug-and-play device. As a result of controlling the start-up process and testing the amplifier modules during installation regarding proper local connectivity, as defined in the present disclosure, it is possible to reduce the number of truck-roll deployments, thereby reducing the waste of time and money to vendors caused by repeated deployments. The amplifier testing can be performed independently of the condition of fiber connectivity at upstream or downstream sites.

Optical Communication Network

Figure 1:
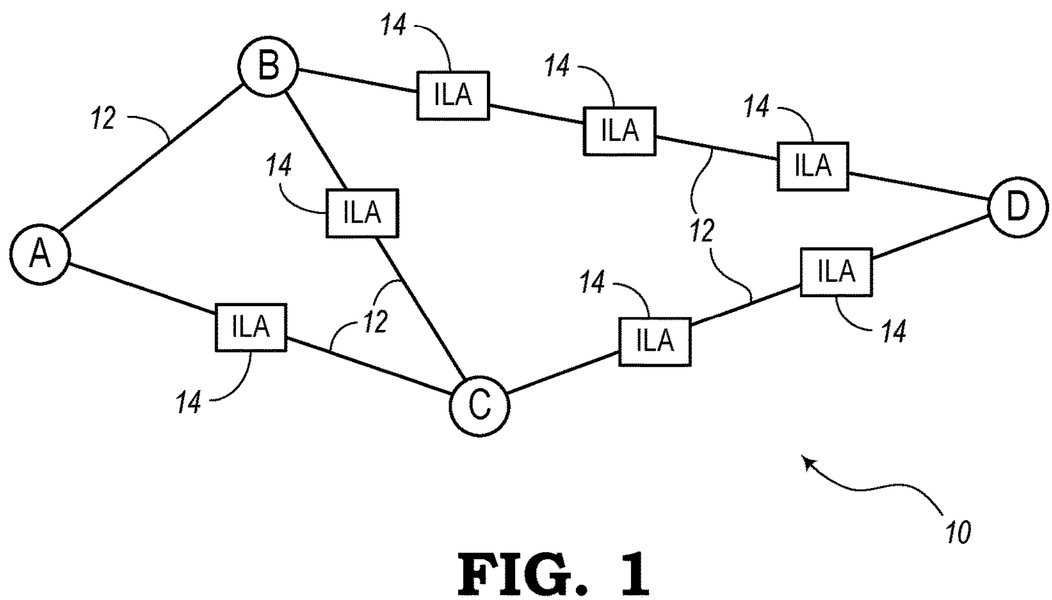
FIG. 1 is a diagram illustrating a portion of an optical communication network, according to various embodiments.

FIG. 1 is a diagram illustrating an embodiment of an optical communication network 10. In this embodiment, the optical communication network 10 includes nodes A, B, C, D, which are located at various distances from each other. The nodes A, B, C, D are connected with each other via a number of optical communication links 12. Attenuation of optical signals is based on the length of the optical communication links 12, among other things. If the length is too great, the optical signals may be attenuated to an undesirable degree. Thus, it may be necessary to install Intermediate Line Amplifiers (ILAs) 14 or repeaters along the length of the optical communication links 12 to boost the signals as needed for transmission from one node to another.

As shown in FIG. 1, nodes A and B are close enough to each other where no ILA 14 is needed between them. However, one ILA 14 is positioned along the link 12 between nodes A and C and one is positioned between nodes B and C. Two ILAs 14 are positioned between nodes C and D, and three ILAs 14 are positioned between nodes B and D.

According to the embodiments of the present disclosure, portions of the optical communication network 10 may be a newly installed. For example, one or more nodes may be newly added, one or more optical communication links 12 may be added between new or existing nodes, and one or more ILAs 14 may be added to new or existing optical communication link 12. In these cases where an ILA 14 is to be installed, the embodiments of the present disclosure may be utilized to automatically power up and test the connectivity of the ILA 14 in the optical communication network 10.

Figure 2:
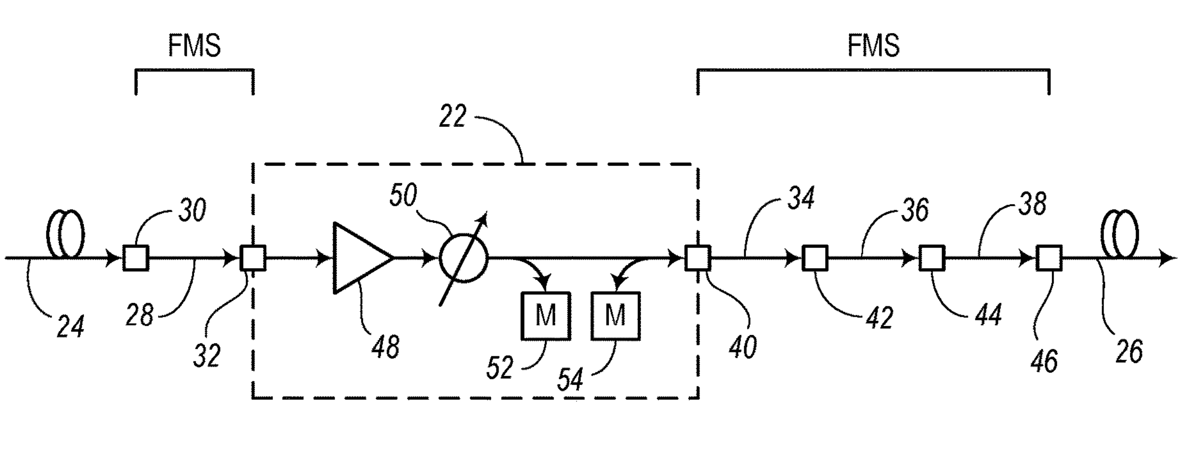
FIG. 2 is a schematic diagram illustrating an installation site where a first type of line amplifier is installed along a link between two adjacent nodes, according to various embodiments.

FIG. 2 is a schematic diagram illustrating an embodiment of an installation site 20 where a first type of line amplifier 22 (e.g., ILA) is installed along a link (e.g., optical communication link 12) between an upstream fiber coil 24 and a downstream fiber coil 26. The upstream fiber coil 24 may be connected to a first node and the downstream fiber coil 26 may be connected to a second node in a network.

In this embodiment, a Point-to-Point Link (PPL) 28 may be connected between the upstream fiber coil 24 and the line amplifier 22. The PPL 28 is connected to the upstream fiber coil 24 via connector 30 and is connected to the optical amplifier card 22 via connector 32. The connector 32, for example, may at least partially reside on an input faceplate of the optical amplifier card 22. The PPL 28 may be monitored by a first Fault Management System (FMS).

Additional PPLs 34, 36, 38 are connected between the line amplifier 22 and the downstream fiber coil 26. The PPL 34 is connected to the line amplifier 22 via connector 40 and is connected to the PPL 36 via connector 42. The connector 40, for example, may at least partially reside on an output faceplate of the optical amplifier card 22. Also, the PPL 36 is connected to the PPL 38 via connector 44, and the PPL 38 is connected to the downstream fiber coil 26 via connector 46. The PPLs 34, 36, 38 may be monitored by a second FMS.

The line amplifier 22 receives input optical signals from connector 32, amplifies the optical signals, and transmits (repeats) the amplified optical signals as output via connector 40. According to this embodiment of FIG. 2, the line amplifier 22 includes a gain unit 48 (e.g., amplifier), a Variable Optical Attenuator (VOA) 50, a first monitor 52 for measuring total optical power, and a second monitor 54 for measuring back-reflection.

Various techniques may be executed for testing connectivity of a line amplifier (e.g., ILA 14, line amplifier 22, etc.), such as during an amplifier installation process. Of course, one technique includes making an initial installation and then revisiting the site for follow-up maintenance if faults are discovered at a later period as calibration runs and lights show up from upstream. Another technique includes manually disconnecting fibers and putting optical loopback connectors to verify amplifier connectivity, as described below with respect to FIG. 3. Still another technique may include running Optical Time-Domain Reflectometry (OTDR) traces in a co-propagating direction, as described below with respect to FIG. 4. However, since trace detected events could be unreliable without following explicit setup and fiber patch recommendations, a technician may need to manually inspect the traces to understand if any loss or reflection from the trace can potentially cause any trouble for Erbium-Doped Fiber Amplifiers (EDFAs) in future use. Also, existing hardware designs do not guarantee a smooth installation process and may force vendors to send installers multiple times to the field for a successful turn-up.

Testing

Figure 3:
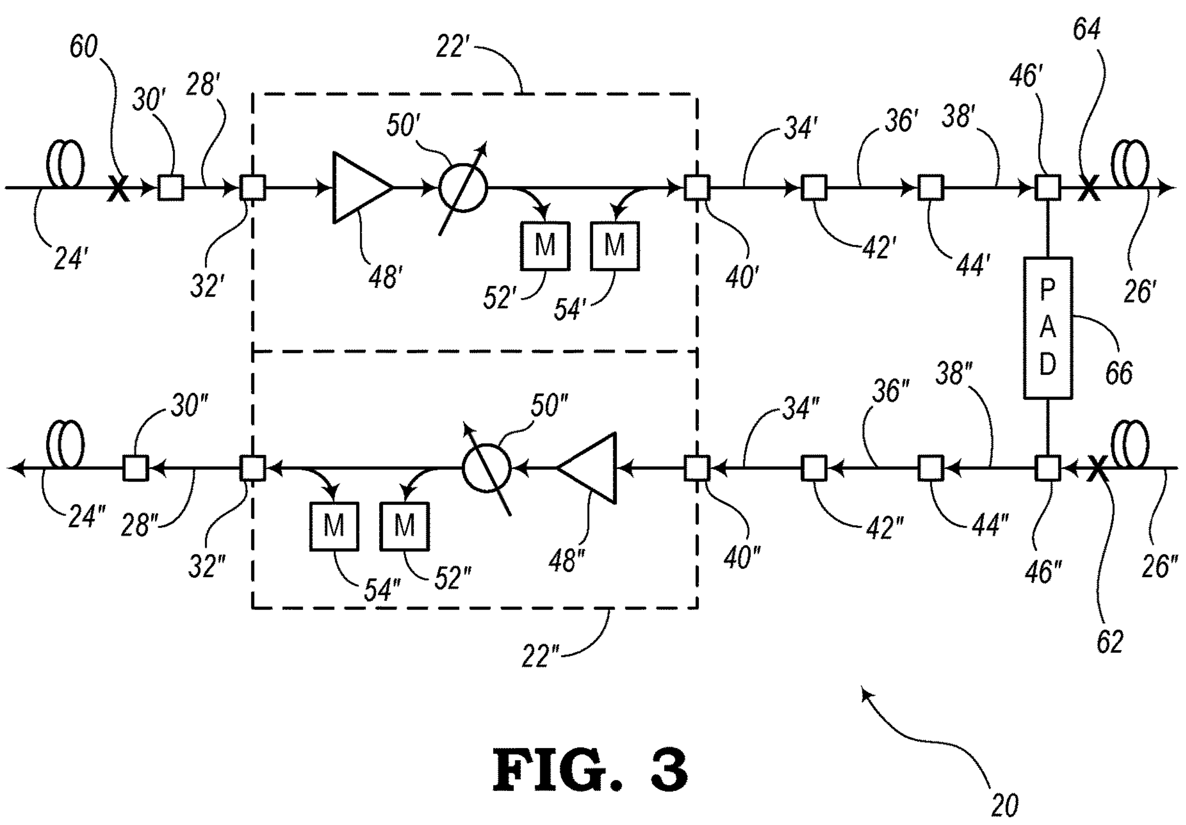
FIG. 3 is a schematic diagram illustrating an installation site where a bi-directional test is performed for testing the first type of line amplifier shown in FIG. 2, according to various embodiments.

FIG. 3 is a schematic diagram illustrating an embodiment of the installation site 20 of FIG. 2 where a bi-directional test is performed for testing the line amplifier 22 shown in FIG. 2. In FIG. 3, the same references numerals (with single prime and double prime characters) are used to designate the same elements shown in FIG. 2, whereby the top set of elements is marked with single prime characters to represent transmission in one direction (i.e., shown from left to right on the page) and whereby the bottom set of elements is marked with double prime characters to represent transmission in the opposite direction (i.e., shown from right to left on the page).

According to this setup, the optical amplifier card 22 (i.e., 22' and 22") can be tested at the stand-alone ILA site (e.g., installation site 20) for Optical Return Loss (ORL) using a fiber disconnect process. The ORL may be equal to the total optical power (e.g., measured by the monitor 52) minus the back-reflection (e.g., measured by the monitor 54) and may be expressed in units of dB. The fiber disconnect process includes installing the line amplifier 22 in the field, disconnecting an input fiber, making a loopback connection at an output, and then generating power from the gain unit 48 (e.g., EDFA) to test the faceplate output connectors 40.

More specifically, the fiber disconnect process shown in FIG. 3 may include the following eight steps:

1. Select one direction, where a first direction points from the upstream fiber coil 24' to the downstream fiber coil 26' (top set) and a second direction points from the downstream fiber coil 26" to the upstream fiber coil 24" (bottom set). In this example, the top set (upstream to downstream) is selected.

2. Disconnect the input connector 30' from the upstream fiber coil 24' (to create disconnection 60) and disconnect the input connector 46" from the downstream fiber coil 26" (to create disconnection 62) for disconnecting inputs from both directions.

3. For the selected direction (top set), disconnect the output connector 46' from the downstream fiber coil 26' (to create disconnection 64) and connect a pad 66 between connectors 46' and 46". The pad 66 may be configured to provide an attenuation of about 20 dB.

4. For the selected amplifier (e.g., gain unit 48') for which the upstream fiber coil 24' is disconnected, put the gain unit 48' into "power" mode. This is an important step to ensure that the input fiber coil 24' is disconnected before the gain unit 48' is put into power mode. Otherwise, damage may be caused to fiber tips of the upstream fiber coil 24'.

5. Do not disconnect the output connector 30" from the upstream fiber coil 24" for the other direction.

6. Verify that there is enough light to achieve satisfactory ORL conditions on both directions before leaving the site.

7. If ORL is reported to be greater than 25 dB for both directions, remove the pad 66 and reconnect input and output connectors 30', 46', 46" to fiber coils 24', 26', 26", respectively.

8. Once the ORL test is done, the optical amplifier card 22 can be set back to a gain mode or gain-clamp mode.

One issue with the embodiment of FIG. 3 is that the installer is required access to the optical amplifier card information after commissioning of a controller module (or other device for controlling or supervising the line amplifier) and manipulating the fiber plants (disconnecting and reconnecting multiple times). However, this does not guarantee that the fibers will be clean when the artificial loopback connector (e.g., pad 66) is removed. Also, the procedures described with respect to FIG. 3 may be considered to add an extra burden to installers since they would need to follow rigorous step-by-step procedures of disconnecting and reconnecting fiber spans, creating a loopback at an output, etc.

Figure 4A:
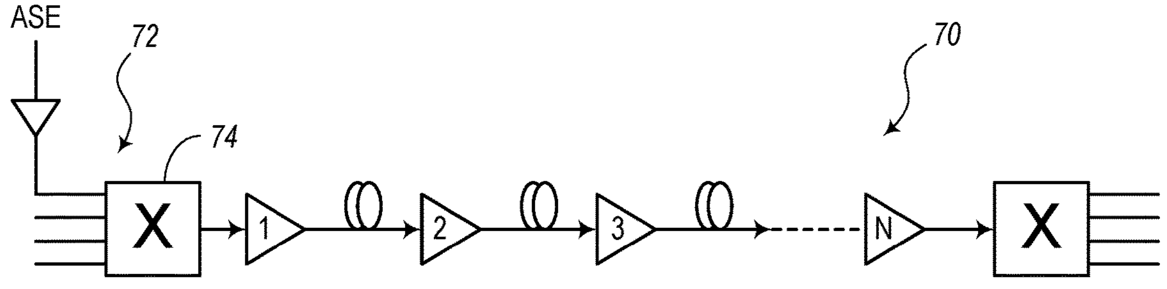
FIGS. 4A and 4B are diagrams illustrating portions of an optical communication network in which another test is performed for testing line amplifiers from a section head, according to various embodiments.
Figure 4B:
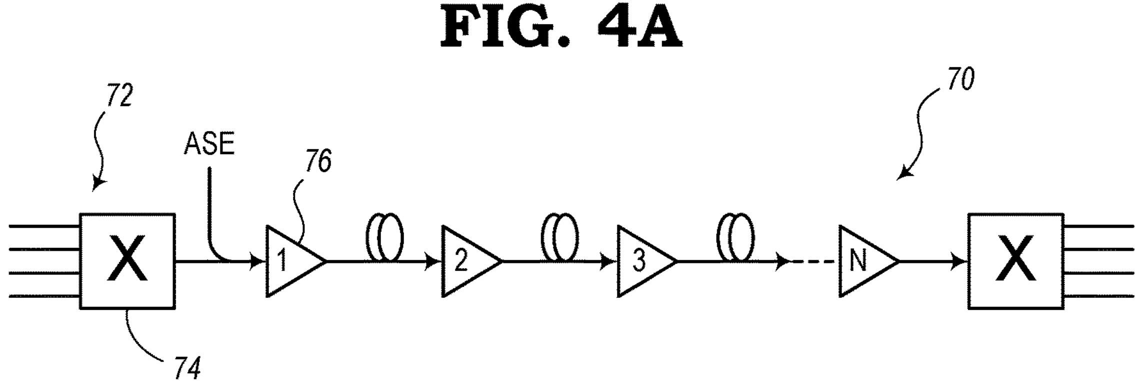

FIGS. 4A and 4B are diagrams illustrating an optical communication network 70 in which another test is performed for testing line amplifiers from a section head 72. The optical communication network 70 may include a plurality (N) of line amplifiers connected by a number (N−1) fiber coils. The tests described with respect to FIGS. 4A and 4B include generating Amplified Spontaneous Emission (ASE) signals at or near the section head 72. For example, the ASE signals may be configured as channel holders for filling up the channels in an optical spectrum. The ASE tests may have some benefits over the loopback test described above with respect to FIG. 3. For example, in the ASE generation test of FIG. 4, ASE is generated from a section-head instead of requiring actions at the installation site. Two possible ASE generation processes may be followed.

As shown in FIG. 4A, a first process includes generating ASE before a section multiplexer switching element 74 and then using the spectrum switching feature of the section multiplexer switching element 74 to generate channelized ASE holders. For example, this may be incorporated in an optical line system with ASE-loading capabilities.

According to a second process, FIG. 4B includes generating ASE from a first optical amplifier (or first optical amplifier card) in the section. The process includes ensuring that all pixels at the section multiplexer switching element 74 are at a blocked state to prevent any light at an input to the first optical amplifier 76 while doing ASE generation to prevent Q-switching impact.

The processes of FIGS. 4A and 4B allow a line amplifier or optical amplifier card for a given direction to be lit following the installation process and configuration processes of all upstream spans and amplifier (e.g., Reconfigurable Optical Add/Drop Multiplexer (ROADM)) sites. When an amplifier is out of a shut-off state, it can detect high back-reflections and generate alarms for installers for debugging.

Figure 5:
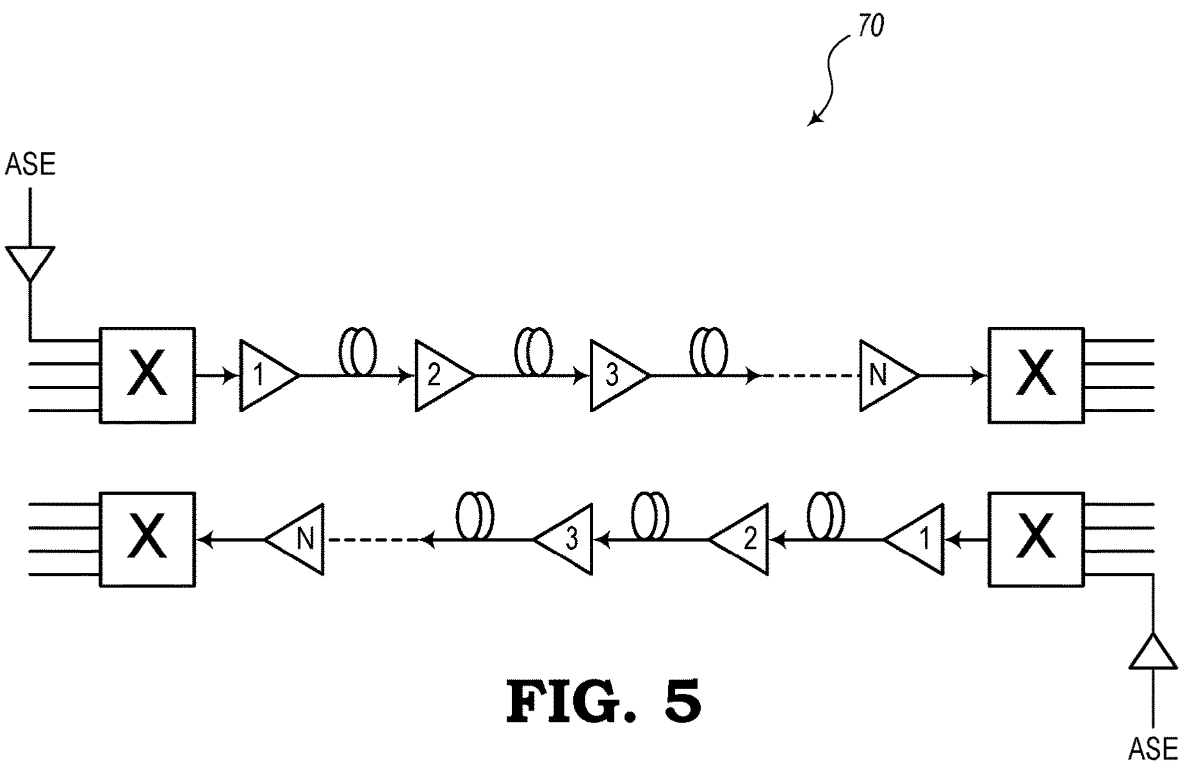
FIG. 5 is a diagram illustrating a portion of an optical communication network in which another bi-directional test is performed to test line amplifiers, according to various embodiments.

FIG. 5 is a diagram illustrating the optical communication network 70 of FIGS. 4A and 4B in which a bi-directional test is performed to test one or more line amplifiers. Both methods for section-head ASE generation depend on upstream connectivity. However, as discussed above, it is likely that this connectivity is not available when installers are initially sent in the field for installation.

In addition, both methods provide directional turn-up in both directions (east-to-west and west-to-east). This means that when installers are at a line amplifier installation site and one direction is able to light up, there is no guarantee when the line amplifier for the other direction will light up, since the light-up process to calibrate line amplifiers from one span to the next is sequential and may take a substantial amount of time. For example, with a 50×span Optical Multiplex Section (OMS), the last span may take about two hours before seeing light in a success path (e.g., no fault in upstream nodes) in an ASE-loaded system.

The process is also dependent on line-fiber faults in upstream spans. That means, for a given direction, until all upstream amplifier nodes are declared non-faulted and calibrated, the local amplifier keeps waiting until enough power is received to come out of the shut-off state and trigger a calibration process. For example, the calibration process may include setting a target gain, gain-tilt, power, etc. Hence, this uncertainty effectively may force installers to use the process of FIG. 3 that involves disconnecting fiber and testing the line amplifier locally regardless of sectional turn-up approaches.

Also, the installation process may include using OTDR traces to detect fiber issues in the co-propagating direction that can potentially cause the line amplifiers (e.g., ILAs 14, optical amplifier cards 22, EDFAs, etc.) to move into an Automatic Power Reduction (APR) state, which may be due to high back-reflection. However, scanning using external OTDR may not guarantee that the faceplate ports and connectors would be clean. Even using a built-in OTDR system (equipped within the optical amplifier card), it can be difficult to successfully detect all loss and reflection events.

For example, it can be difficult to detect loss and back-reflection if there are back-to-back amplifier cards (e.g., two cascaded EDFAs, a combination of an EDFA and a Raman amplifier, etc.) and there is not enough fiber patch cord between them to detect faceplate events. The length of any patch panel cord from the faceplate to the fiber spool, for instance, may be below the OTDR trace deadzone. In this case, the OTDR may fail to detect an event. For example, a 30 ns OTDR trace having a 35 m deadzone would mean that events within 35 m before or after the faceplate (or any patch panel connector event shorter than 35 m) are not detected.

Since the high reflection issue for EDFA is a booster direction issue (co-propagating direction), there is no such recommendation for installers to follow an explicit minimum length for each patch panels. Hence, the built-in OTDR detection system may not be useful in this case for detecting future APR conditions for EDFAs.

Controller

Figure 6:
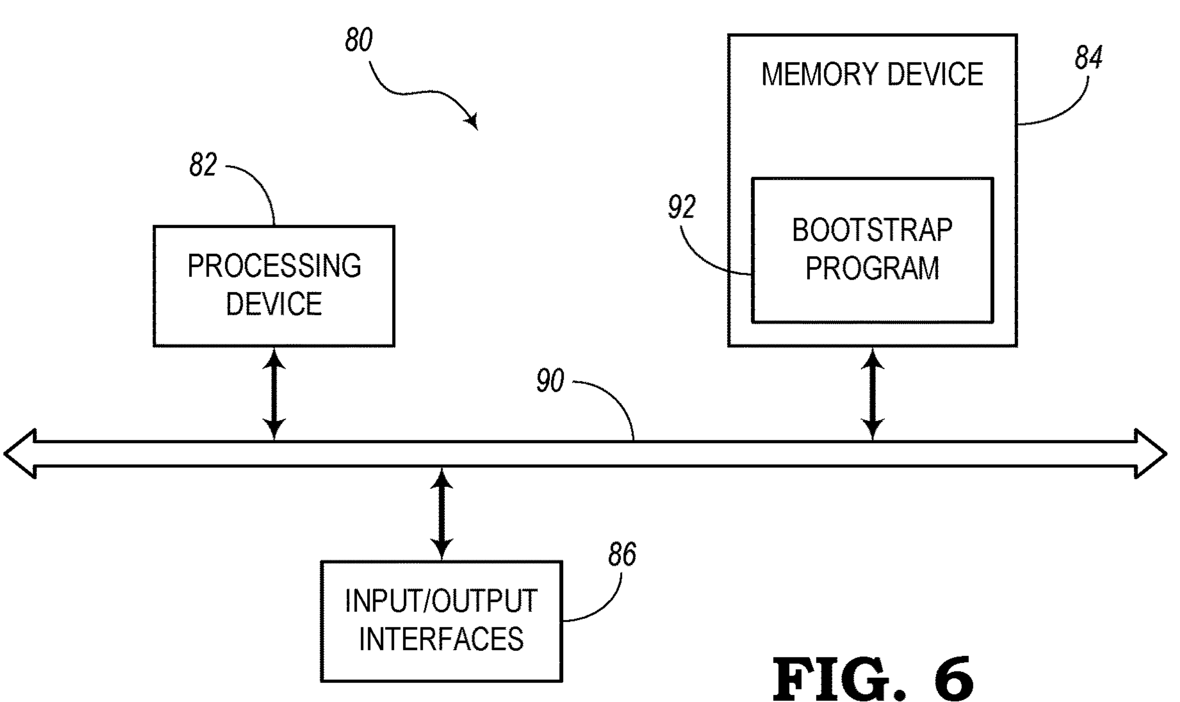
FIG. 6 is a block diagram illustrating an on-board controller arranged on an optical amplifier card for controlling a bootstrapping process when a line amplifier is installed, according to various embodiments.

FIG. 6 is a block diagram illustrating an embodiment of an on-board controller 80 arranged on an optical amplifier card for controlling a bootstrapping process when a line amplifier is installed. As the name suggests, the on-board controller 80 may be housed on the optical amplifier card itself to allow a self-initiated turn-up process. In this embodiment, the on-board controller 80 includes a processing device 82, a memory device 84, and Input/Output (I/O) interfaces 86 in communication with each other via a local interface 90.

The on-board controller 80 also includes a bootstrap program 92. The bootstrap program 92 may be configured in software and/or firmware and stored in the memory device 84. In other embodiments, the bootstrap program 92 may additionally or alternatively be configured in hardware of the processing device 82. The bootstrap program 92 is configured to automatically power up a line amplifier (or optical amplifier card) when it is initially installed in an optical line to allow the amplifier to operate in an optical network.

The I/O interfaces 86 in this embodiment may include buttons, switches, etc. to allow an installer to indicate to the on-board controller 80 that the device (e.g., line amplifier, optical amplifier card, etc.) has been installed and is ready for the bootstrap process. In other embodiments, the line amplifier may automatically perform the bootstrap process. Also, the I/O interfaces 86 may include one or more indicators (e.g., LEDs, etc.) for indicating when the progress of the bootstrap process. For example, when the bootstrap process is complete, the I/O interfaces 86 may illuminate a green LED indicating completion.

Figure 7:
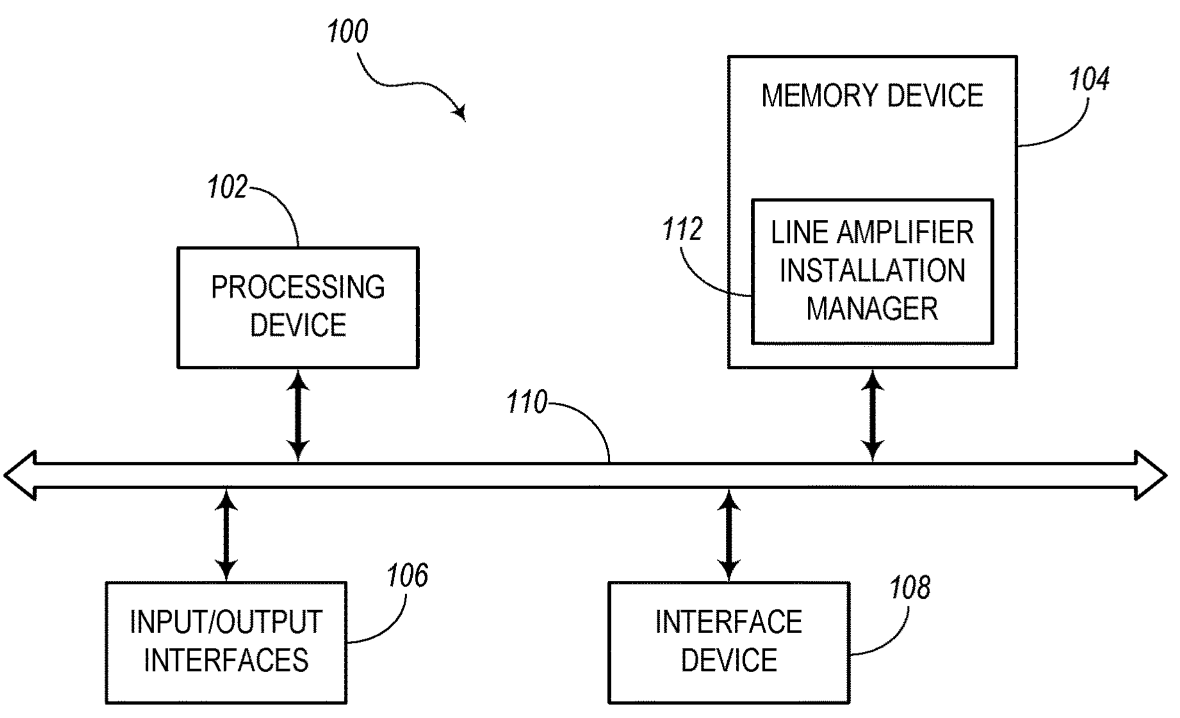
FIG. 7 is a block diagram illustrating a supervisory device for controlling operations associated with the installation of a line amplifier, according to various embodiments.

FIG. 7 is a block diagram illustrating an embodiment of a supervisory device 100 for controlling operations associated with the installation of a line amplifier. As opposed to the on-board controller 80 described with respect to FIG. 6, the supervisory device 100 may be housed externally to the line amplifier or optical amplifier card. Nevertheless, the supervisory device 100 may be configured to communicate with the line amplifier or optical amplifier card to control power-up, turn-up, or bootstrap processes of the amplifier that is newly installed in the optical network.

In this embodiment, the supervisory device 100 includes a processing device 102, a memory device 104, I/O interfaces 106, and an interface device 108. The components 102, 104, 106, and 108 may be configured in communication with each other via a local interface 110. The supervisory device 100 may further include a line amplifier installation manager 112, which may be configured in hardware, software, and/or firmware in the processing device 102 and/or the memory device 104. The line amplifier installation manager 112 is configured to control installation processes when a line amplifier is newly installed in an optical system.

The interface device 108 may be configured to allow the supervisory device 100 to communicate with one or more external devices and may be connected directly or indirectly to these one or more external devices. As such, one of these external devices may be a newly-installed line amplifier to be controlled by the supervisory device 100 during the installation process. In other embodiments, the interface device 108 may be connected to a communication network (e.g., optical communication network 10) for communicating with a local or remote newly-installed line amplifier.

In the illustrated embodiments of FIGS. 6 and 7, the on-board controller 80 and supervisory device 100 may be a digital computer that, in terms of hardware architecture, generally includes processing devices 82, 102, memory devices 84, 104, Input/Output (I/O) interfaces 86, 106, and interface device 108. The memory devices 84, 104 may include a data store, database, or the like. It should be appreciated by those of ordinary skill in the art that FIGS. 6 and 7 depict the on-board controller 80 and supervisory device 100 in a simplified manner, where practical embodiments may include additional components and suitably configured processing logic to support known or conventional operating features that are not described in detail herein. The components (i.e., 82, 84, 86) are communicatively coupled via the local interface 90 in FIG. 6 and the components (i.e., 102, 104, 106, 108) are communicatively coupled via the local interface 110 in FIG. 7. The local interfaces 90, 110 may be, for example, but not limited to, one or more buses or other wired or wireless connections. The local interfaces 90, 110 may have additional elements, which are omitted for simplicity, such as controllers, buffers, caches, drivers, repeaters, receivers, among other elements, to enable communications. Further, the local interfaces 90, 110 may include address, control, and/or data connections to enable appropriate communications among the components.

The processing devices 82, 102 are hardware devices adapted for at least executing software instructions. The processing devices 82, 102 may be any custom made or commercially available processor, a Central Processing Unit (CPU), an auxiliary processor among several processors associated with the on-board controller 80 and supervisory device 100, a semiconductor-based microprocessor (in the form of a microchip or chip set), or generally any device for executing software instructions. When the on-board controller 80 and supervisory device 100 are in operation, the processing devices 82, 102 may be configured to execute software stored within the memory devices 84, 104, to communicate data to and from the memory devices 84, 104, and to generally control operations of the on-board controller 80 and supervisory device 100 pursuant to the software instructions.

It will be appreciated that some embodiments of the processing devices 82, 102 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing devices 82, 102 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 86, 106 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 86, 106 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The interface device 108 may be used to enable the supervisory device 100 to communicate over a network, such as the optical communication network 10, the Internet, a Wide Area Network (WAN), a Local Area Network (LAN), and the like. The interface device 108 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The interface device 108 may include address, control, and/or data connections to enable appropriate communications on the optical communication network 10.

The memory devices 84, 104 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory devices 84, 104 may incorporate electronic, magnetic, optical, and/or other types of storage media. The memory devices 84, 104 may have a distributed architecture, where various components are situated remotely from one another, but can be accessed by the processing devices 82, 102. The software in memory devices 84, 104 may include one or more software programs, each of which may include an ordered listing of executable instructions for implementing logical functions. The software in the memory devices 84, 104 may also include suitable Operating Systems (O/Ss) and one or more computer programs. The O/Ss essentially control the execution of other computer programs, and provides scheduling, input-output control, file and data management, memory management, and communication control and related services. The computer programs may be configured to implement the various processes, algorithms, methods, techniques, etc. described herein.

The memory devices 84, 104 may include a data store used to store data. In one example, the data store may be located internal to the on-board controller 80 and supervisory device 100 and may include, for example, an internal hard drive connected to the local interfaces 90, 110 in the on-board controller 80 and supervisory device 100. Additionally, in another embodiment, the data store may be located external to the on-board controller 80 and supervisory device 100 and may include, for example, an external hard drive connected to the Input/Output (I/O) interfaces 86, 106 (e.g., SCSI or USB connection). In a further embodiment, the data store may be connected to the on-board controller 80 and supervisory device 100 through a network and may include, for example, a network attached file server.

Moreover, some embodiments may include a non-transitory computer-readable storage medium having computer readable code stored in the memory devices 84, 104 for programming the on-board controller 80 and supervisory device 100 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing devices 82, 102 that, in response to such execution, cause the processing devices 82, 102 to perform a set of operations, steps, methods, processes, algorithms, functions, techniques, etc. as described herein for the various embodiments.

The bootstrap program 92 and line amplifier installation manager 112 may include similar processes as described with respect to the various embodiments of the present disclosure for conducting installation or set-up steps when a line amplifier or optical amplifier card is being installed or has newly been installed in an optical communication link (e.g., optical communication link 12).

Optical Amplifier Card

Figure 8:
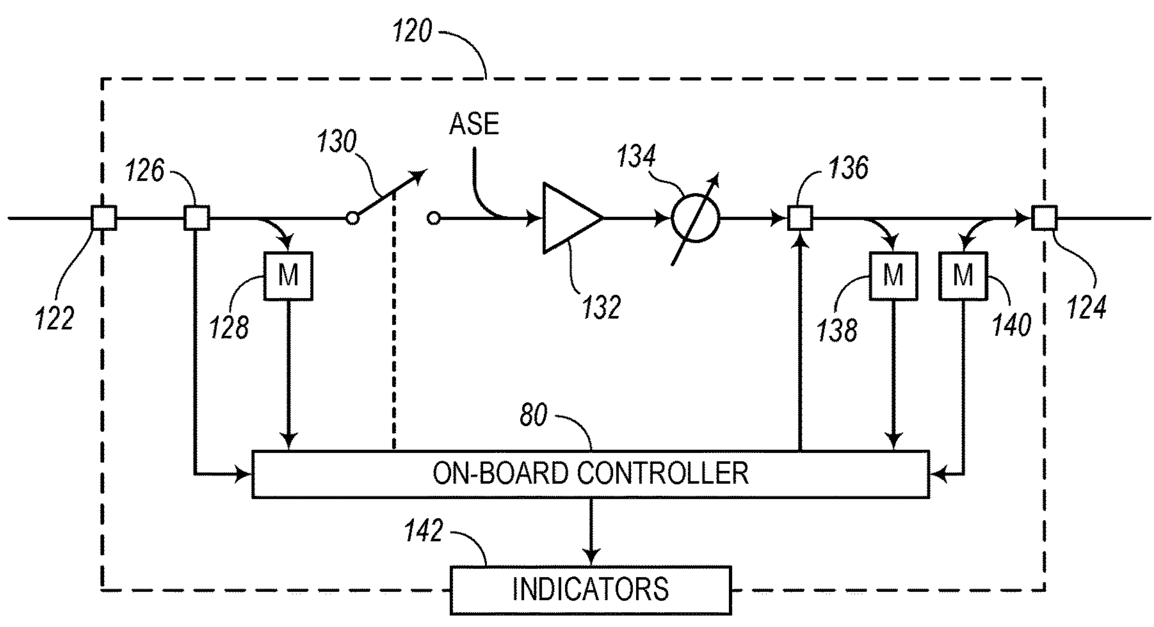
FIG. 8 is a schematic diagram illustrating an optical amplifier card where the on-board controller of FIG. 6 is arranged thereon, according to various embodiments.

FIG. 8 is a schematic diagram illustrating an optical amplifier card 120, which may be part of a line amplifier device installed at an installation site. The optical amplifier card 120 in this embodiment includes the on-board controller 80 of FIG. 6 arranged thereon. The optical amplifier card 120 also includes an input faceplate connector 122 configured for connecting the optical amplifier card 120 to an upstream fiber coil (not shown) and an output faceplate connector 124 configured for connecting the optical amplifier card 120 to a downstream fiber coil (not shown).

Furthermore, the optical amplifier card 120 includes an Optical Supervisory Channel (OSC) receiver filter 126 for detecting external OSC control signals from an external control device and providing these OSC control signals to the on-board controller 80. An input total power monitor 128 is configured to detect the total optical power at the input of the optical amplifier card 120. The optical amplifier card 120 further includes an optical blocking device 130 configured to block light to a gain unit 132 as needed and to allow light to pass to the gain unit 132 as needed. The gain unit 132 amplifies the optical signals propagating through the optical amplifier card 120. In this embodiment, the gain unit 132 may include a fixed amplification level. Also, the gain may be adjusted using a Variable Optical Attenuator (VOA) device 134, which, in some embodiments, may also be controlled by the on-board controller 80.

The optical amplifier card 120 further includes a OSC transmitter filter 136 for providing OSC control signals from the on-board controller 80. Also, the optical amplifier card 120 includes an output total power monitor 138, which is configured to detect the total optical power at the output of the optical amplifier card 120. A back-reflection monitor 140 is configured to detect optical back-reflections that are reflected back from the output of the optical amplifier card 120. In addition, one or more indicators 142 may be arranged on the optical amplifier card 120 and/or on a housing in which the optical amplifier card 120 resides. The one or more indicators 142 may be configured to provide visual and/or audible indications to a user (e.g., installer) regarding the status of installation, boot-up, power-up, turn-up processes. These processes may be executed as a result of the optical amplifier card 120 being newly installed or based on other situations where optical amplifier card 120 may be re-booted or re-introduced into an optical link.

Therefore, the optical amplifier card 120 includes a modification of conventional amplifier card designs by introducing an optical blocker (i.e., the optical blocking device 130) or switch at the input of the amplifier gain block (i.e., the gain unit 132). The optical blocking device 130 is configured to block any incoming light to the amplifier. The on-board controller 80 is configured to introduce a novel bootstrap process for the card turn-up by putting the gain unit 132 (e.g., EDFA) in an Amplified Spontaneous Emission (ASE) generation mode in which an ASE source is configured to provide ASE channel holders into the line of the optical amplifier card 120, such as at the input of the gain unit 132 (as shown) or elsewhere in the line.

The main input remains blocked until a "connectivity" factor and a "cleanliness" factor have been verified. For example, the connectivity factor may be related to the proper connectivity between the optical amplifier card 120 and an upstream fiber coil (via the input faceplate connector 122) and/or the proper connectivity between the optical amplifier card 120 and a downstream fiber coil (via the output faceplate connector 124). The cleanliness factor may be related to proper cleanliness of fibers of the upstream and downstream fiber coils when being connected to the input faceplate connector 122 and output faceplate connector 124, respectively. By providing automatic control of the turn-up process, the optical amplifier card 120 may be considered to be a "plug and play" device to allow the installers to simply install the optical amplifier card 120 without requiring manual testing. Also, an installer can receive relatively instant feedback regarding the status of the newly-installed optical amplifier card 120 such that the installation can be made right during this initial visit to the installation site, without any dependency on a controller module or upstream commissioning and fiber connectivity.

Figure 9:
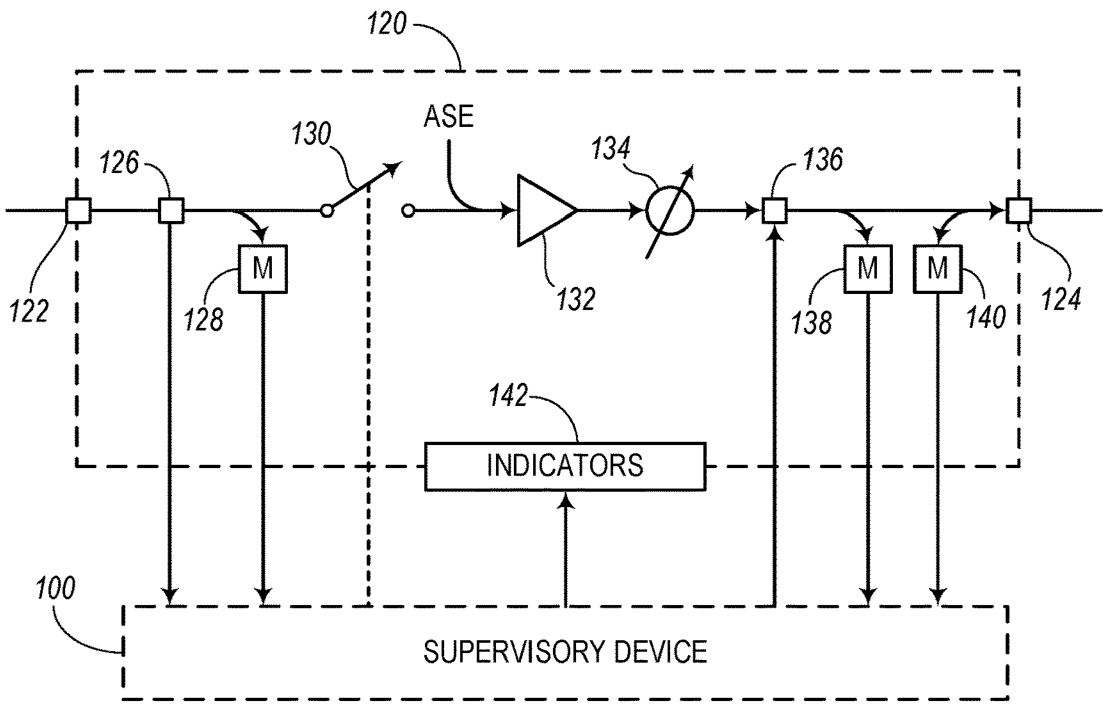
FIG. 9 is a schematic diagram illustrating an optical amplifier card controllable by the supervisory device of FIG. 7, according to various embodiments.

FIG. 9 is a schematic diagram illustrating another embodiment of an optical amplifier card 150. In this embodiment, the optical amplifier card 150 is configured to be controllable by the supervisory device of FIG. 7. The optical amplifier card 150 includes many of the same elements as described above with respect to the optical amplifier card 120 of FIG. 8. For example, the optical amplifier card 150 include the elements 122, 124, 126, 128, 130, 132, 134, 136, 138, 140, and 142 described above. However, instead of an on-board controller (e.g., on-board controller 80), the optical amplifier card 150 is configured to be controlled by the supervisory device 100 described with respect to FIG. 7 or controlled by another control device external to the optical amplifier card 150 using external communication interfaces 144.

The optical amplifier cards 120, 150 are therefore equipped with an optical blocker or switch (i.e., optical block device 130) at the input of the gain unit 132 that can effectively block all or most of the light to the gain unit 132. At installation time, when the optical amplifier card 120, 150 is turned up for the first time, the controller (e.g., on-board controller 80, supervisory device 100, etc.) is configured to keep the input to the gain unit 132 in a blocked state while powering up the optical amplifier card 120, 150 in an ASE generation mode. The ASE generation mode may be achieved by allowing an ASE source to generate ASE channel holder signals having enough power to allow detection of back-reflections (e.g., by the back-reflection monitory 140) at the output of the optical amplifier card 120, 150, but nevertheless is low enough where the risk of fiber damage is minimized (e.g., below a threshold of 10 dBm).

After powering up in the ASE generation mode, the controller 80, 100 is configured to automatically unblock the input to the gain unit 132 (e.g., by allowing light to pass through the optical block device 130, by "closing" a switch, etc.). Also, at this point, the controller 80, 100 is configured to flip the optical amplifier card 120, 150 from the ASE generation mode to a regular operating mode, such as a gain/gain-clamp or power mode. According to some embodiments, the controller 80, 100 is configured to flip the amplifier mode from ASE generation to regular operation mode 1) when the back reflection (e.g., detected by the monitor 140) at the amplifier output is below a certain threshold, and 2) when a valid input power (e.g., detected by the input total power monitor 128) is above a predetermined shut-off threshold of the optical amplifier card 120, 150 or when the OSC receiver filter 126 detects OSC connectivity from an upstream supervisory/control device or supervisory device 100. It should be noted that the optical blocking device 130 is placed after the OSC receiver filter 126 and/or after the input total power monitor 128 at the input of the optical amplifier card 120, 150 to enable the automatic control processes described above.

Figure 10:
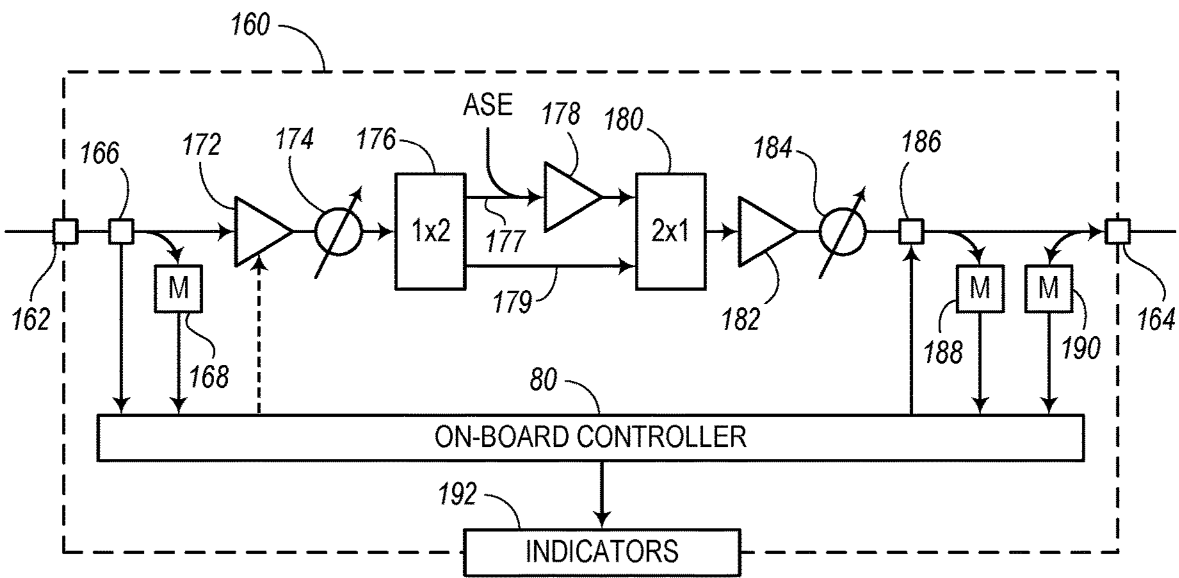
FIG. 10 is a schematic diagram illustrating another optical amplifier card configured with the on-board controller of FIG. 6, according to various embodiments.
Figure 11:
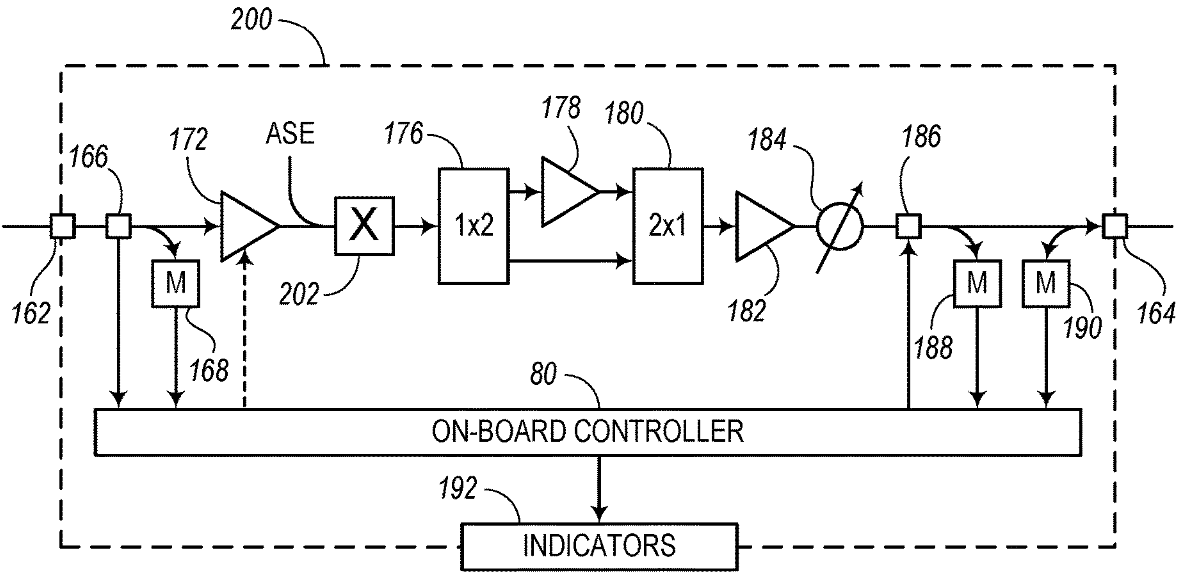
FIG. 11 is a schematic diagram illustrating yet another optical amplifier card configured with the on-board controller of FIG. 6, according to various embodiments.

FIGS. 10 and 11 are schematic diagrams illustrating additional embodiments of optical amplifier cards. It should be noted that although the optical amplifier cards as described in FIGS. 10 and 11 are controlled by on-board controllers, the optical amplifier cards, according to alternative embodiments, may be controlled by one or more external supervisory devices.

FIG. 10 shows an optical amplifier card 160 configured to be controlled by the on-board controller 80 of FIG. 6 or other local control device. In this embodiment, the optical amplifier card 160 includes an input faceplate connector 162 configured for connecting the optical amplifier card 160 to an upstream fiber coil (not shown) and an output faceplate connector 164 configured for connecting the optical amplifier card 160 to a downstream fiber coil (not shown).

Furthermore, the optical amplifier card 160 includes an Optical Supervisory Channel (OSC) receiver filter 166 for detecting external OSC control signals from an external control device and providing these OSC control signals to the on-board controller 80. An input total power monitor 168 is configured to detect the total optical power at the input of the optical amplifier card 160. The optical amplifier card 160 further includes an adjustable gain unit 172, which may include one or more optical amplifiers. The adjustable gain unit 172 may be controlled by the on-board controller 80 to adjust the amplification or gain of optical signals through the adjustable gain unit 172. Therefore, the adjustable gain unit 172 may produce a variable amplification level and may therefore differ from the fixed amplification level provided by the gain unit 132 shown in FIG. 8. The adjustable gain unit 172 may be configured in various implementations to block (attenuate) light partially or completely and/or can provide no or positive amplification as needed. The optical amplifier card 160 may further include a VOA 174, which may be controlled by the on-board controller 80 to adjust the gain or attenuation.

The optical amplifier card 160, according to the embodiment of FIG. 10, further includes a 1×2 selector 176 (e.g., switch, splitter, etc.) configured to enable selection of one of two paths. A first path 177 is directed to another gain unit 178 and a second path 179 bypasses the gain unit 178. The gain unit 178 may include one or more optical amplifiers. An ASE source may be used to provide ASE channel holders on the first path 177 to create an ASE generate mode similar to the ASE modes described above. A 2×1 coupler 180 is configured to couple the signals from the two paths 177, 179. Furthermore, the optical amplifier card 160 includes another gain unit 182 (e.g., one or more optical amplifiers) and a VOA device 184 for adjusting the gain/attenuation of optical signals through the optical amplifier card 160.

The optical amplifier card 160 further includes a OSC transmitter filter 186 for receiving OSC control signals from the on-board controller 80. Also, the optical amplifier card 160 includes an output total power monitor 188, which is configured to detect the total optical power at the output of the optical amplifier card 160. A back-reflection monitor 190 is configured to detect optical back-reflections that are reflected back from the output of the optical amplifier card 160. In addition, one or more indicators 192 may be arranged on the optical amplifier card 160 and/or on a housing in which the optical amplifier card 160 resides. The one or more indicators 192 may be configured to provide visual and/or audible indications to a user (e.g., installer) regarding the status of installation, boot-up, power-up, turn-up processes. These processes may be executed as a result of the optical amplifier card 160 being newly installed or based on other situations where optical amplifier card 160 may be re-booted or re-introduced into an optical link.

Therefore, the optical amplifier card 160 also includes a modification of conventional amplifier card designs by allowing one or more gain units 172 and VOAs 174 to provide a blocking function to block incoming light at the input. Again, the on-board controller 80 is configured to introduce novel bootstrap processes for the optical amplifier card 160 for allowing it to turn-up by blocking incoming light while transitioning to an Amplified Spontaneous Emission (ASE) generation mode in which the ASE source is configured to provide ASE channel holders into the first path 177 and essentially in an output line of the optical amplifier card 160.

The main input remains blocked until the "connectivity" factor and the "cleanliness" factor have been verified, as described above. Again, the connectivity factor may be related to the proper connectivity between the optical amplifier card 160 and an upstream fiber coil (via the input faceplate connector 162) and/or the proper connectivity between the optical amplifier card 160 and a downstream fiber coil (via the output faceplate connector 164). The cleanliness factor, as mentioned above, may be related to proper cleanliness of fibers of the upstream and downstream fiber coils when being connected to the input faceplate connector 162 and output faceplate connector 164, respectively. By providing automatic control of the turn-up process, the optical amplifier card 160 may be considered to be a "plug and play" device to allow the installers to simply install the optical amplifier card 160 without requiring manual testing. Also, an installer can receive relatively instant feedback regarding the status of the newly-installed optical amplifier card 160 such that the installation can be made right during this initial visit to the installation site, without any dependency on a controller module or upstream commissioning and fiber connectivity.

FIG. 11 is a schematic diagram illustrating yet another optical amplifier card 200 configured with the on-board controller 80 (or relying on external control from the supervisory device 100 or other external control devices). The optical amplifier card 200 include many of the same elements as described above with respect to FIG. 10. However, in this embodiment, the VOA 174 shown in FIG. 10 is replaced with a switching element 202. Also, the ASE source is arranged in this embodiment before the switching element 202. This implementation also allows the controller (e.g., on-board controller 80, supervisory device 100, etc.) to provide the bootstrap, turn-up, power-up procedures described herein.

Instead of introducing the extra switch (e.g., optical blocking device 130) in the amplifier, as described with respect to FIGS. 8 and 9, the embodiments of FIGS. 10 and 11 include alternative ways of providing input blocking functions. The blocking may be achieved by forcing shutoff to at least one or more internal gain-block stages (e.g., at least gain unit 172) and then generating ASE from one or more downstream gain-block stages (e.g., at least gain units 178, 182, etc.) in the ASE generation mode. In some embodiments, the optical amplifiers (e.g., gain units 132, 172, 178, 182, etc.) may be multi-stage amplifiers. In some cases, these amplifiers may include three stages, four stages, or more.

Process for Controlling a Bootstrapping Procedure

Figure 12:
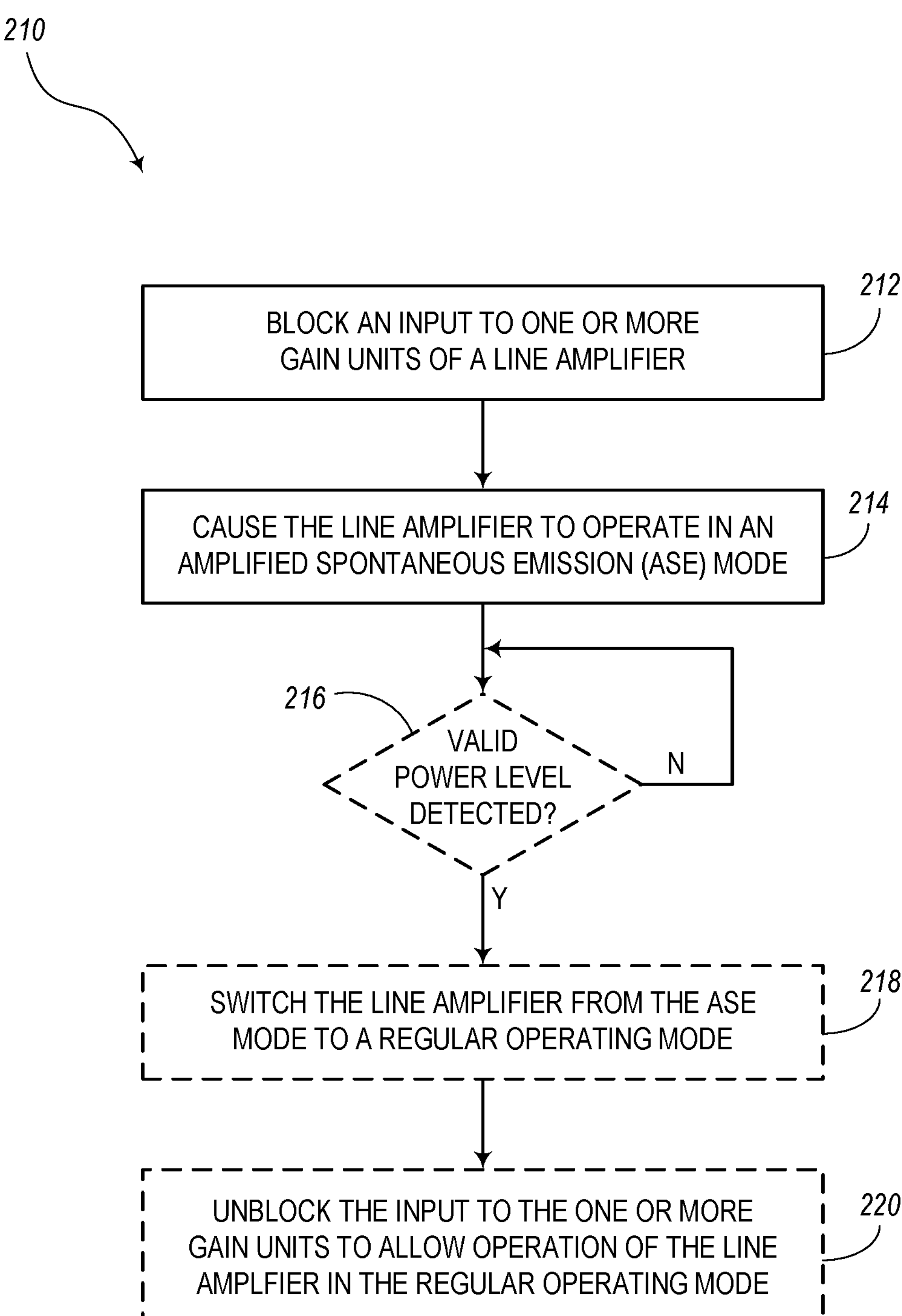
FIG. 12 is a flow diagram illustrating a process for controlling a bootstrapping procedure for a line amplifier newly installed in an optical communication network, according to various embodiments.

FIG. 12 is a flow diagram illustrating an embodiment of a process 210 for controlling a bootstrapping procedure for a line amplifier newly installed in an optical communication network. In this embodiment, the process 210 includes a step of blocking an input to one or more gain units of a line amplifier, as indicated in block 212. The process 210 also includes causing the line amplifier to operate in an ASE mode, as indicated in block 214. While operating in the ASE mode, the process 210 includes determining if a valid power level is detected, as indicated in decision diamond 216. When a valid power level is detected, the process 210 proceeds to block 218, which includes the step of switching the line amplifier from the ASE mode to a regular operating mode. Then, the process 210 includes unblocking the input to the one or more gain units to allow operation of the line amplifier in the regular operating mode, as indicted in block 220.

The process 210 may be implemented by the line amplifier itself when equipped with a local controller (e.g., on-board controller 80). Otherwise, the process 210 may be implemented on the line amplifier by control instructions from a remote controller device (e.g., supervisory device 100). The controllers (e.g., on-board controller 80, supervisory device 100, etc.) may include a processing device 82, 102 and a memory device 84, 104 configured to store a bootstrap program 92, line amplifier installation manager 112, or other control processing logic. The logic may include instructions that, when executed, enable the processing device to perform the bootstrapping, turn-up, power-up, installation processes described in the present disclosure.

Furthermore, the process 210 may be configured such that, before causing the line amplifier to operate in the ASE mode, the logic may enable the processing device to automatically power up the line amplifier based on the line amplifier being newly installed in an optical line system. The processing device may be configured to automatically power up the line amplifier independent of upstream connectivity and upstream fault conditions. The line amplifier may be an intermediate line amplifier newly installed in the optical line system intermediately between two adjacent nodes.

The process 210 of FIG. 12 may also be configured whereby detection of the valid power level may include one or more of 1) determining that an input optical power is above a shutoff threshold, and 2) confirming connectivity with an upstream Optical Supervisory Channel (OSC) device. Detection of the valid power level may further include determining that a back-reflection detected at an output of the line amplifier is below a predetermined threshold.

Also, the process 210 may include utilizing a light blocking device connected to the input to the one or more gain units, whereby blocking the input to the one or more gain units may include controlling the light blocking device to shut off optical power to the one or more gain units. The one or more gain units may include one or more controllable gain units whereby blocking the input to the one or more gain units may include shutting off the one or more controllable gain units. The one or more gain units may further include one or more ASE-generating units configured to enable the line amplifier to operate in the ASE mode. For example, operating in the ASE mode may include a step of providing a power level below a fiber damage threshold level and above a level configured to enable detection of back-reflection at an output of the line amplifier.

Therefore, the systems and methods of the present disclosure may provide a number of advantages over conventional methods of powering up an amplifier, particularly after the amplifier has been newly installed in an optical line. For example, one advantage may be realized whereby a high isolation switch or blocker prevents any incoming light while the amplifier is in an ASE generation mode. That, in turn, prevents any possibility of Q-switching impact that can possibly damage immediate downstream connectors. Q-switching, for example, causes a short giant pulse from amplifier when light shows up at input at ASE generation process.

Also, the embodiments of the present disclosure allow installers to make a worry-free installation and can reduce the number of re-visits to the installation sites. Instead of requiring the installers to test the installations, the present disclosure provides embodiments whereby, as soon as the optical amplifier card is powered up, it can be automatically checked for back reflection that can be used to guarantee output fiber connectivity.

Another advantage is that the systems and methods described herein do not necessarily require a full installation or commissioning of a controller module since the bootstrap process is effectively governed by the control software/firmware on the card or from a local supervisory device. Without a controller module, it is even possible for the card to visually indicate the back-reflection status for the corresponding output port (e.g., by lighting up an LED indicator for high vs low reflection).

The present embodiments also allow installers to verify connectivity in both directions locally during their first installation attempt without disrupting any fiber plants (e.g., no disconnecting and reconnecting procedures) or without worrying about controller module installation or commissioning processes. Although the additional hardware controller (e.g., on-board controller 80) on the amplifier card may cost a little more, the benefit is that it can effectively reduce the number of truck-rolls and save installers from the need to return to the installation site for second or subsequent visits to the site. Thus, there would likely be a substantial savings in operating expenses for vendors who may be willing to pay the extra cost for the value derived from controlling installation procedures as described herein.

FIG. 13 illustrates that any amplifier including amplifiers at the channel-mux and channel demux can be put into an ASE generation mode for validation fiber connectivity. That is, while the present disclosure makes reference to line amplifiers, the techniques described herein can be implemented at any optical amplifier in an optical line system, including optical amplifiers at ROADM sites as illustrated in FIG. 13.

Single Span Calibration—Problem Description

Figure 14:
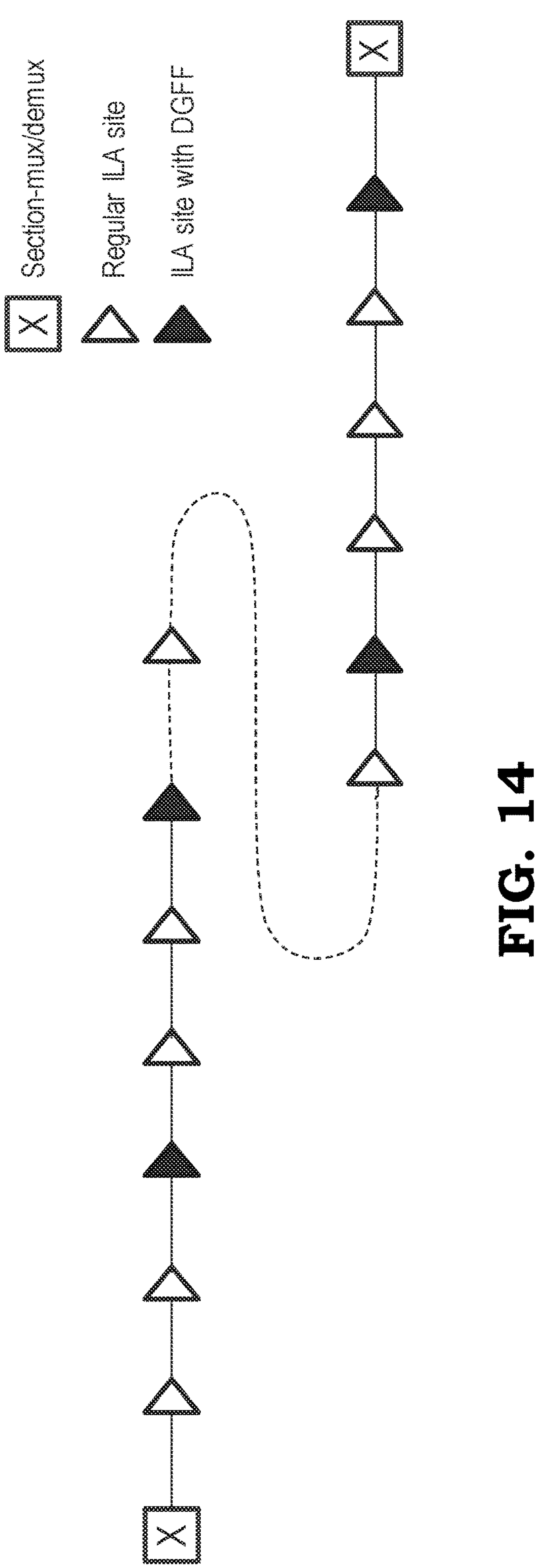
FIG. 14 is a network diagram of a multi-span optical line system for description the problems with the conventional approaches.

FIG. 14 illustrates a network diagram of a multi-span optical line system for description the problems with the conventional approaches. With the introduction of DGFF modules with the ILA modules, line systems can be deployed with very long chain of ILAs or span-counts for a given OMS (Optical Multiplex Section). The most typical deployments for an optical line system includes 16-20× spans (~1600 km) in long-haul network, and in some cases, that extends to 30×spans (~2400 km) or even up to 50× spans (~4000 km). In FIG. 14, there are two section mux/demux elements, i.e., ROADMs, interconnected via a plurality of ILAs, including regular ILAs and periodic ILAs with DGFFs. After initial deployment of a network, there are use cases in the field that requires calibration or recalibration of a single span or plurality of discrete spans within the OMS.

Current approaches for calibration or recalibration only allow calibrating the complete OMS and does not support single span calibration. This is primarily because, changing calibrated setpoints for a given node (such as launch powers to fiber span) affect all downstream spans. Hence, existing calibration or recalibration approaches always sequence actions from one node to next (in the direction of light) until the tail of an OMS. However, calibration or recalibration of line system is time-expensive and affects the recovery time in a MW. For example, a 50×spans OMS calibration can take around 2 hours to complete When only one or a few spans require changes in a MW, it becomes costly to run the full OMS calibration/re-calibration actions. The present disclosure allows a single span calibration action without disrupting calibrated setpoints to any downstream spans and avoids the need for full OMS calibration.

Single Span Calibration—Use Cases

The present disclosure here focuses on single span calibration or recalibration techniques in an already calibrated system. There are multiple use cases that demands a single span calibration in the field that includes the following:

(1) Fiber-type is changed for one fiber-span that may require a change in launch power profile to the span, (2) Change of launch power profiles in general to obtain better link budget, but focused on discrete span(s) only, (3) Change of significant span loss following maintenance operation that may require an amplifier to change its supported gain-ranges (such as moving from low gain range mode to high gain range) or replacing a low gain range capable amp with a higher gain range one or vice versa. In some cases, this involves introducing a 2nd amp (such as cascaded EDFAs or Raman amplification along with EDFAs), and (4) Database restore on a span based on some previously calibrated setpoints. Note, although a database restores all mux/demux WSS or DGFF attenuations on their previous setpoints, the attenuations are set in one-step open-loop fashion and creates offsets for spectrums due to open-loop attenuation settings inaccuracies in WSS modules. Such accuracies are typically 10% of total attenuation adjustments.

Process for Single Span Calibration

The present disclosure provides techniques for single span calibration that can run in an optical line system without disrupting downstream spans' calibrated setpoints and keeping the calibration sequence limited to two ends of a span only. The techniques are capable of automatically detecting the need for recalibrating a single span following an Optical Line Fail (OLF) recovery and hence, avoids the need for user initiated full-OMS recalibration, saving valuable time in maintenance window operations.

Figure 15:
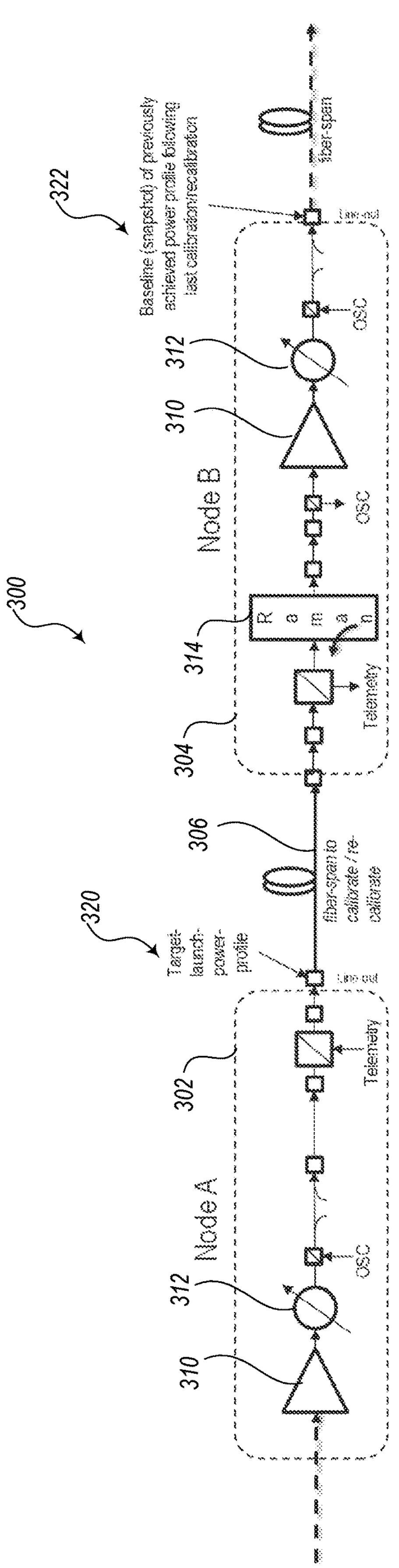
FIG. 15 is a network diagram of a single span in a multi-span optical line system, for illustrating single span calibration.

FIG. 15 is a network diagram of a single span 300 in a multi-span optical line system, for illustrating single span calibration. The single span 300 includes two nodes 302, 304, interconnected by a fiber span 306 that is to be calibrated/re-calibrated. The nodes 302, 304 includes an ILA 310 and a VOA 312. The node 304 includes a counter-propagating Raman amplifier 314. Note, the single span 300 is in-between a plurality of spans in a multi-span optical line system (not shown).

The nodes 302, 304 are two line elements on each end of the single span 300. In this example, the node A 302 can be referred to as the from-end and the node B 304 can be referred to as the to-end. The process for single span calibration ensures no other upstream node is calibrating or in faulted condition (within the OMS), The process for single span calibration calibrates the "from-end" node 302 with a new target-launch-power-profile 320 to the fiber span 306, and then calibrates the "to-end" node 304 by using a baseline power-profile 322 (spectrum-snapshot of previously achieved power profile following last calibration/recalibration) as a new launch-profile target to calibrate all local actuators at the "to-end" node 304.

Calibration at the from-end node 302 involves setting a local target-launch-power-profile 320 to the fiber span 306 based on provisioned or discovered span-fiber characteristics (such as fiber-type, span-loss, span-length etc.), and calibrating all actuators at the "from-end" to achieve the local target-launch-power-profile.

Calibration at the to-end node 304 involves setting previously saved baseline power profile 322 as a new target-launch-power-profile for a next fiber span and calibrating all actuators at the "to-end" to regain the previously achieved baseline power profile. In this way, the process ensures the single span calibration from this span does not disrupt calibrated set-points to any other spans downstream. The process ensures the calibration sequence remains limited to two end nodes 302, 304 of the requested fiber span 306 and does not sequence any action to any further downstream nodes within the OMS.

Calibrating line elements on each of the nodes 302, 304 involves (1) running Raman gain calibration to search for min and max Raman gain achievable for a given fiber span 306 if the Raman amplifier is available to the fiber span and the Raman-gain-calibration process was never run for this given span for the given fiber characteristics (such as fiber-type), (2) setting appropriate target-gain and gain-tilt for Raman, EDFA amplifiers and loss for VOAs, and (3) setting DGFF attenuations to minimize any impacts of cumulative gain-ripples coming from upstream spans.

A trigger for a single span calibration or recalibration can include:

- User initiated actions to run recalibration on a single span only
- Following an Optical-Line-Fail (OLF) recovery (automatic or user-triggered)
- Change in fiber-types or any other fiber-characteristics (following OLF) that demands a change in spectrum launch profile to avoid any link budget penalties (such as Optical Signal-to-Noise Ratio (OSNR) or non-linear penalties)
- Change in span loss, where the span loss change is large enough to create an undershoot or saturation condition in downstream amplifier since that requires a gain-range-mode change in downstream amplifiers (e.g., there are evidences from the field where span loss changing by 10-12 dB following link-repair by fiber vendors, creating large power offset on downstream span since the amp is out of dynamic gain-range for a previously provisioned gain-range-mode)

Figure 16:
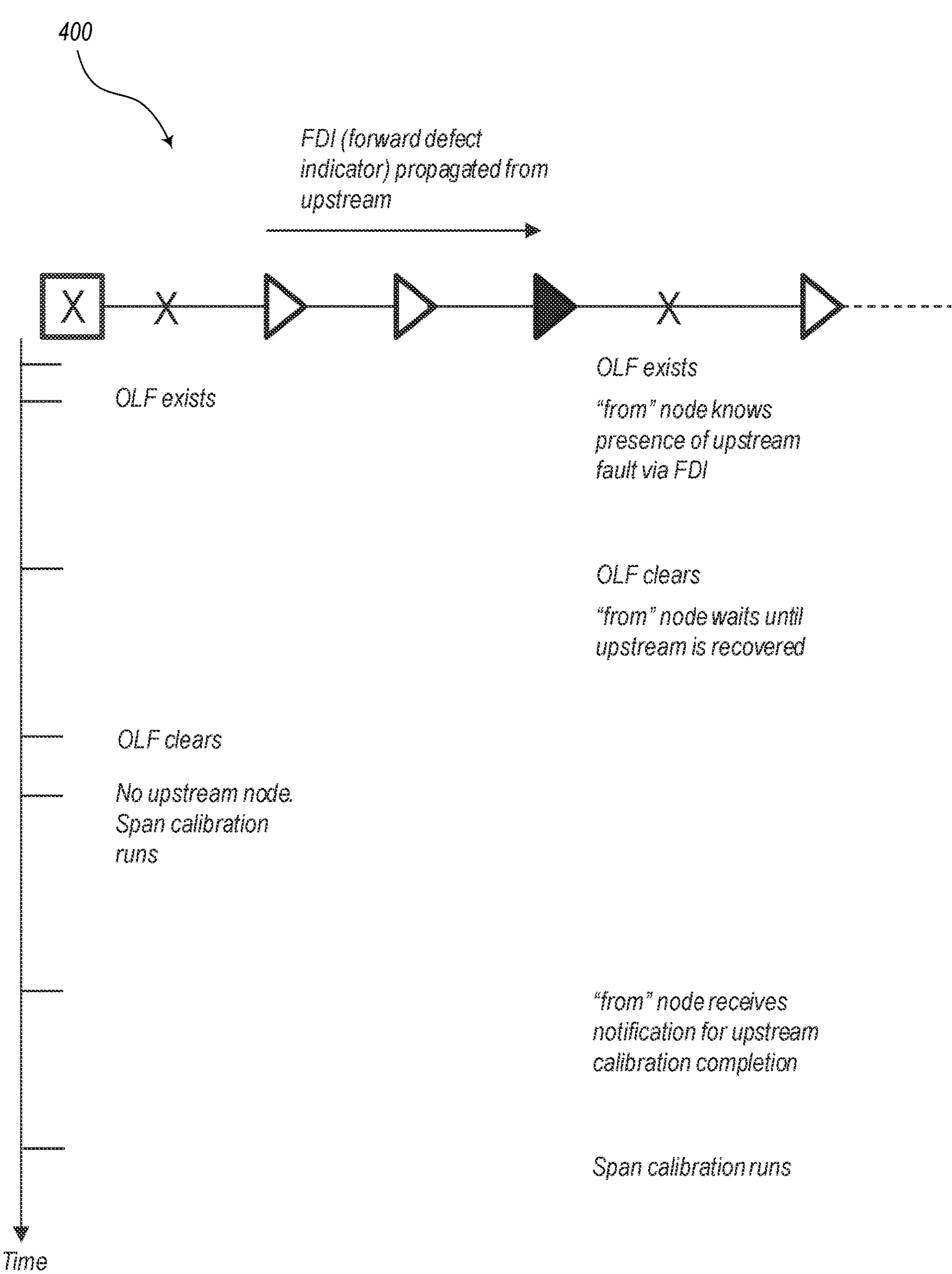
FIG. 16 is a network diagram of a portion of an optical line system illustrating recovery for a plurality of discrete spans.

FIG. 16 is a network diagram of a portion of an optical line system 400 illustrating recovery for a plurality of discrete spans. If there are fiber-repairs taking place in plurality of discrete spans, then the process is capable of automatically sequencing actions between the discrete spans, and hence, avoids any manual user intervention. Before running, the method ensures no other upstream nodes are in the middle of calibration actions or no other upstream spans are in faulted condition (such as OLF, Shutoff of amplifiers, optical blocking conditions) and orchestrates an action only when the upstream span fault is recovered, and a re-calibration action is done.

FIG. 17 is a flowchart of a process 500 for single span calibration. The process 500 can be implemented as a method having steps, via a processing device configured to cause implementation of the steps, and as a non-transitory computer-readable medium having instructions than, when executed, cause the processing device to implement the steps.

The process 500 includes, responsive for a requirement to calibrate a single span in a multi-span optical line system where the single span includes a from-end node and a to-end node, determining no other upstream node in the multi-span optical multiplex section is currently calibrating or faulted (step 502); responsive to no other upstream node currently calibrating or faulted, calibrating the from-end node with a new target launch power into a fiber associated with the single span (step 504); and calibrating the to-end node keeping target launch power into a fiber associated with an immediate downstream span from the single span uninterrupted from a previous calibration (step 506). Of note, the calibration is only for the single span, not the other spans in the multi-span optical line system.

The to-end node and the from-end node are each (1) an intermediate line amplifier or (2) a terminal node and an intermediate line amplifier, in the multi-span optical. The calibrating the from-end node can include setting the new target launch power based on provisioned or discovered characteristics of the single span. The characteristics include any of fiber type, span loss, inclusion or exclusion of Raman amplification, and span length The calibrating the to-end node can include setting all actuators at the to-end node to the baseline power profile, such that the calibration of the single span does not disrupt any downstream spans. The keeping target launch power into a fiber associated with an immediate downstream span can include using a baseline power profile taken on the line-out port from a previous calibration. The calibrating the to-end node includes setting all actuators at the to-end node to the baseline line-out power profile, such that the calibration of the single span does not disrupt any downstream spans. The the calibrating the from-end node and the calibrating the to-end node includes setting target gain and gain tilt for any Erbium Doped Fiber Amplifiers (EDFAs), running gain-calibration and setting target-gain for Raman amplifiers if present, and setting loss for Variable Optical Attenuators (VOAs). The calibrating the from-end node and the calibrating the to-end node can include setting Dynamic Gain Flattening Filter (DGFF) attenuation based on cumulative gain-ripples coming from upstream spans.

The requirement to calibrate the single span can include a plurality of discrete or continuous spans in the multi-span optical multiplex section, and the steps include can sequencing a calibration of the plurality of discrete or continuous spans in the multi-span optical multiplex section. The requirement is one of a user-initiated calibration, subsequent to an Optical Line Fail (OLF) recovery, a change in fiber type or fiber characteristics, a change in span loss, and a change in Raman amplification.

CONCLUSION

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A method comprising steps of:

responsive for a requirement to calibrate a single span in a multi-span optical multiplex section where the single span includes a from-end node and a to-end node, determining no other upstream node in the multi-span optical multiplex section is currently calibrating or faulted;

responsive to no other upstream node currently calibrating or faulted, calibrating the from-end node with a new target launch power into a fiber associated with the single span; and calibrating the to-end node keeping target launch power into a fiber associated with an immediate downstream span from the single span uninterrupted from a previous calibration, wherein the keeping target launch power into a fiber associated with an immediate downstream span includes using a baseline line-out power profile taken on a line-out port from a previous calibration.

2. The method of claim 1, wherein the to-end node and the from-end node are each one of (1) an intermediate line amplifier and (2) a terminal node and an intermediate line amplifier, in the multi-span optical line system.

3. The method of claim 1, wherein the calibrating the from-end node includes setting the new target launch power based on provisioned or discovered characteristics of the single span.

4. The method of claim 3, wherein the characteristics include any of fiber type, span loss, inclusion or exclusion of Raman amplification, and span length.

5. The method of claim 1, wherein the calibrating the to-end node includes setting all actuators at the to-end node to the baseline line-out power profile, such that the calibration of the single span does not disrupt any downstream spans.

6. The method of claim 1, wherein the calibrating the from-end node and the calibrating the to-end node includes performing Raman gain calibration if present.

7. The method of claim 1, wherein the calibrating the from-end node and the calibrating the to-end node includes setting target gain and gain tilt for any Erbium Doped Fiber Amplifiers (EDFAs), running gain-calibration and setting target-gain for Raman amplifiers if present, and setting loss for Variable Optical Attenuators (VOAs).

8. The method of claim 1, wherein the calibrating the from-end node and the calibrating the to-end node includes setting Dynamic Gain Flattening Filter (DGFF) attenuation based on cumulative gain-ripples coming from upstream spans.

9. The method of claim 1, wherein the requirement to calibrate the single span includes a plurality of discrete or continuous spans in the multi-span optical multiplex section, and wherein the steps include sequencing a calibration of the plurality of discrete or continuous spans in the multi-span optical multiplex section.

10. The method of claim 1, wherein the requirement is one of a user-initiated calibration, subsequent to an Optical Line Fail (OLF) recovery, a change in fiber type or fiber characteristics, a change in span loss, and a change in Raman amplification.

11. A non-transitory computer-readable medium comprising instructions that, when executed, cause a processing device to perform steps of:

responsive for a requirement to calibrate a single span in a multi-span optical multiplex section where the single span includes a from-end node and a to-end node, determining no other upstream node in the multi-span optical multiplex section is currently calibrating or faulted;

responsive to no other upstream node currently calibrating or faulted, calibrating the from-end node with a new target launch power into a fiber associated with the single span; and calibrating the to-end node keeping target launch power into a fiber associated with an immediate downstream span from the single span uninterrupted from a previous calibration, wherein the keeping target launch power into a fiber associated with an immediate downstream span includes using a baseline line-out power profile taken on a line-out port from a previous calibration.

12. The non-transitory computer-readable medium of claim 11, wherein the to-end node and the from-end node are each one of (1) an intermediate line amplifier and (2) a terminal node and an intermediate line amplifier, in the multi-span optical line system.

13. The non-transitory computer-readable medium of claim 11, wherein the calibrating the from-end node includes setting the new target launch power based on provisioned or discovered characteristics of the single span.

14. The non-transitory computer-readable medium of claim 11, wherein the calibrating the to-end node includes setting all actuators at the to-end node to the baseline line-out power profile, such that the calibration of the single span does not disrupt any downstream spans.

15. The non-transitory computer-readable medium of claim 11, wherein the calibrating the from-end node and the calibrating the to-end node includes performing Raman gain calibration if present.

16. The non-transitory computer-readable medium of claim 11, wherein the calibrating the from-end node and the calibrating the to-end node includes setting target gain and gain tilt for any Erbium Doped Fiber Amplifiers (EDFAs), running gain-calibration and setting target-gain for Raman amplifiers if present, and setting loss for Variable Optical Attenuators (VOAs).

17. The non-transitory computer-readable medium of claim 11, wherein the calibrating the from-end node and the calibrating the to-end node includes setting Dynamic Gain Flattening Filter (DGFF) attenuation based on cumulative gain-ripples coming from upstream spans.

18. The non-transitory computer-readable medium of claim 11, wherein the requirement to calibrate the single span includes a plurality of discrete or continuous spans in the multi-span optical multiplex section, and wherein the steps include sequencing a calibration of the plurality of discrete or continuous spans in the multi-span optical multiplex section.

* * * * *